(12) United States Patent
Aono et al.

(10) Patent No.: US 12,348,707 B2
(45) Date of Patent: Jul. 1, 2025

(54) IMAGE DECODING APPARATUS AND IMAGE CODING APPARATUS

(71) Applicant: SHARP KABUSHIKI KAISHA, Sakai (JP)

(72) Inventors: Tomoko Aono, Sakai (JP); Yukinobu Yasugi, Sakai (JP); Tomohiro Ikai, Sakai (JP); Zheming Fan, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 86 days.

(21) Appl. No.: 18/105,250

(22) Filed: Feb. 3, 2023

(65) Prior Publication Data

US 2024/0107004 A1 Mar. 28, 2024

(30) Foreign Application Priority Data

Sep. 27, 2022 (JP) ................................. 2022-153695

(51) Int. Cl.
*H04N 19/105* (2014.01)
*H04N 19/11* (2014.01)
(Continued)

(52) U.S. Cl.
CPC ........... *H04N 19/105* (2014.11); *H04N 19/11* (2014.11); *H04N 19/132* (2014.11);
(Continued)

(58) Field of Classification Search
CPC .... H04N 19/105; H04N 19/11; H04N 19/132; H04N 19/159; H04N 19/176; H04N 19/46
(Continued)

(56) References Cited

U.S. PATENT DOCUMENTS

| 11,470,317 B2* | 10/2022 | Lee ...................... H04N 19/176 |
| 2014/0269922 A1* | 9/2014 | Nagaoka ................ H04N 19/52 375/240.16 |

(Continued)

OTHER PUBLICATIONS

Keming Cao. EE2-related: Fusion for template-based intra mode derivation, Joint Video Experts Team (JVET) of ITU-T SG 16 WP 3 and ISO/IEC JTC 1/SC 29 23rd Meeting, by teleconference, Jul. 7-16, 2021, JVET-W0123.

(Continued)

*Primary Examiner* — Matthew David Kim
(74) *Attorney, Agent, or Firm* — ScienBiziP, P.C.

(57) ABSTRACT

Object
Known derivation, in units of intra prediction modes, of a template-based intra prediction mode based on a difference between a template prediction image and a template image has a problem that derivation of the template image and cost calculation require great computational resources.
Solution
An image decoding apparatus includes an intra prediction image generation unit configured to generate a template prediction image for a prescribed intra prediction mode candidate, a template cost derivation unit configured to derive a cost from the template prediction image and a template image corresponding to an image near a target block, and an intra prediction image generation unit configured to generate an intra prediction image by using a selected intra prediction mode, and a reference sample is sampled that is used to generate the template prediction image.

12 Claims, 12 Drawing Sheets

(51) Int. Cl.
*H04N 19/132* (2014.01)
*H04N 19/159* (2014.01)
*H04N 19/176* (2014.01)
*H04N 19/46* (2014.01)

(52) U.S. Cl.
CPC ......... *H04N 19/159* (2014.11); *H04N 19/176* (2014.11); *H04N 19/46* (2014.11)

(58) Field of Classification Search
USPC ...................................................... 375/240.02
See application file for complete search history.

(56) References Cited

U.S. PATENT DOCUMENTS

| 2019/0166370 | A1* | 5/2019 | Xiu | ...................... H04N 19/154 |
| 2020/0374513 | A1* | 11/2020 | Xiu | ...................... H04N 19/176 |
| 2021/0274214 | A1* | 9/2021 | Moon | .................... H04N 19/46 |
| 2022/0232241 | A1* | 7/2022 | Wang | ................... H04N 19/176 |
| 2022/0248025 | A1* | 8/2022 | Deng | ................... H04N 19/132 |
| 2023/0179784 | A1* | 6/2023 | Li | ......................... H04N 19/88 |
| 2023/0336711 | A1* | 10/2023 | Teng | .................... H04N 19/103 |
| 2023/0412801 | A1* | 12/2023 | Yang | .................... H04N 19/593 |
| 2024/0357081 | A1* | 10/2024 | Chen | ..................... H04N 19/52 |

OTHER PUBLICATIONS

Bytedance Inc., "EE2-related: Template-based intra mode derivation using MPMs", JVET-V0098-v2, The Joint Video Experts Team (JVET) of ITU-T SG 16 WP 3 and ISO/IEC JTC 1/SC, 22nd Meeting, by teleconference, Apr. 20, 2021-Apr. 28, 2021, Apr. 22, 2021 (Apr. 22, 2021).

* cited by examiner

| coding_unit( x0, y0, cbWidth, cbHeight, treeType ) { | Descriptor |
|---|---|
| ... | |
| if( CuPredMode[ x0 ][ y0 ] == MODE_INTRA ) { | |
|   dimd_flag[x0][y0] | |
|   if(treeType==SINGLE_TREE || (treeType==DUAL_TREE_LUMA && dimd_flag[x0][y0]==0)) { | |
|     if( cbWidth <= 32 && cbHeight <= 32 ) | |
|       intra_bdpcm_flag[ x0 ][ y0 ] | ae(v) |
|     if( intra_bdpcm_flag[ x0 ][ y0 ] ) | |
|       intra_bdpcm_dir_flag[ x0 ][ y0 ] | ae(v) |
|     else { | |
|       if( sps_mip_enabled_flag && (Abs(Log2(cbWidth) − Log2(cbHeight))<=2) && <br>        cbWidth<=MaxTbSizeY && cbHeight<=MaxTbSizeY && dimd_flag[x0][y0]==0) | |
|         intra_mip_flag[ x0 ][ y0 ] | ae(v) |
|       if( intra_mip_flag[ x0 ][ y0 ] ) { | |
|         intra_mip_mpm_flag[ x0 ][ y0 ] | ae(v) |
|         if( intra_mip_mpm_flag[ x0 ][ y0 ] ) | |
|           intra_mip_mpm_idx[ x0 ][ y0 ] | ae(v) |
|         else | |
|           intra_mip_mpm_remainder[ x0 ][ y0 ] | ae(v) |
|       } else { | |
|         if(sps_mrl_enabled_flag && ((y0 % CtbSizeY) > 0) && dimd_flag[x0][y0] == 0) { | |
|           timd_flag[ x0 ][ y0 ] | ae(v) |
|           if( timd_flag[ x0 ][ y0 ]==0) | |
|             intra_luma_ref_idx[ x0 ][ y0 ] | |
|         } | |
|         if (sps_isp_enabled_flag && intra_luma_ref_idx[x0][y0]==0 && timd_flag[x0][y0]==0 && <br>          (cbWidth<=MaxTbSizeY && cbHeight<=MaxTbSizeY) && <br>          (cbWidth*cbHeight>MinTbSizeY*MinTbSizeY)) | |
|           intra_subpartitions_mode_flag[ x0 ][ y0 ] | ae(v) |
|         if(intra_subpartitions_mode_flag[x0][y0]==1 && cbWidth<=MaxTbSizeY && cbHeight<=MaxTbSizeY) | |
|           intra_subpartitions_split_flag[ x0 ][ y0 ] | ae(v) |
|         if ( dimd_flag[ x0 ][ y0 ] == 0 || intra_luma_ref_idx[x0][y0]==0 || timd_flag[x0][y0]==0 ) { | |
|           intra_luma_mpm_flag[ x0 ][ y0 ] | ae(v) |
|         if( intra_luma_mpm_flag[ x0 ][ y0 ] ) { | |
|           if( intra_luma_ref_idx[ x0 ][ y0 ] == 0 ) | |
|             intra_luma_not_planar_flag[ x0 ][ y0 ] | ae(v) |
|           if( intra_luma_not_planar_flag[ x0 ][ y0 ] ) | |
|             intra_luma_mpm_idx[ x0 ][ y0 ] | ae(v) |
|         } else | |
|           intra_luma_mpm_remainder[ x0 ][ y0 ] | ae(v) |
|         } | |
|       } | |
|     } | |
|   } | |
|   if( treeType == SINGLE_TREE || treeType == DUAL_TREE_CHROMA ) | |
|     intra_chroma_pred_mode[ x0 ][ y0 ] | ae(v) |
| ... | |
| } | |

FIG. 8

IMAGE DECODING APPARATUS AND IMAGE CODING APPARATUS

TECHNICAL FIELD

Embodiments of the present invention relate to an image decoding apparatus and an image coding apparatus.

BACKGROUND ART

A video coding apparatus which generates coded data by coding a video, and a video decoding apparatus which generates decoded images by decoding the coded data are used for efficient transmission or recording of videos.

For example, specific video coding schemes include schemes proposed in H.264/AVC and High-Efficiency Video Coding (HEVC), Versatile Video Coding (VVC), and the like.

In such a video coding scheme, images (pictures) constituting a video are managed in a hierarchical structure including slices obtained by splitting an image, coding tree units (CTUs) obtained by splitting a slice, units of coding (which may also be referred to as coding units (CUs)) obtained by splitting a coding tree unit, and transform units (TUs) obtained by splitting a coding unit, and are coded/decoded for each CU.

In such a video coding scheme, usually, a prediction image is generated based on a local decoded image that is obtained by coding/decoding an input image (a source image), and prediction errors (which may be referred to also as "difference images" or "residual images") obtained by subtracting the prediction image from the input image are coded. Generation methods of prediction images include an inter-picture prediction (inter prediction) and an intra-picture prediction (intra prediction).

In addition, the recent technology for video coding and decoding includes NPL 1. NPL 1 discloses a Template-based Intra Mode Derivation (TIMD) prediction in which a decoder generates a prediction image by deriving an intra-direction prediction mode number using pixels in an adjacent region.

CITATION LIST

Non Patent Literature

NPL 1
K. Cao, N. Hu, V. Seregin, M. Karczewicz, Y. Wang, K. Zhang, L. Zhang, K. Zhang, L. Zhang, "EE2-related Fusion for template-based intra mode derivation", JVET-W0123

SUMMARY OF INVENTION

Technical Problem

In template-based intra mode derivation such as in NPL 1, an image of a template reference region near a target block is used to generate a template prediction image from adjacent images (template images) of the target block for intra prediction mode candidates. Then, as an intra prediction mode of the target block, an intra prediction mode candidate is selected for which a cost for the template image and the template prediction image is reduced. However, a problem with the template-based intra mode derivation is the need for derivation of template prediction images for the multiple intra prediction mode candidates and cost calculation for the derivation, leading to the need for very large computational resources.

An object of the present invention is to reduce the complexity of the template-based intra mode derivation while maintaining the accuracy of the prediction image.

Solution to Problem

An image decoding apparatus includes a parameter decoder configured to decode coded data into a template-based intra mode derivation flag, a reference sample derivation unit configured to derive a reference sample by using an image of a template reference region near a target block, an intra prediction image generation unit configured to generate, by using the reference sample, a template prediction image for an intra prediction mode candidate predetermined, a template cost derivation unit configured to derive a cost from the template prediction image and a template image corresponding to an image near the target block, and an intra prediction mode selection unit configured to select an intra prediction mode for the target block based on the cost, and in a case that the template-based intra mode derivation flag has a prescribed value, a prediction image of the target block is generated by using the selected intra prediction mode.

The intra prediction image generation unit of the image decoding apparatus derives the cost by using a variable to be incremented by a value greater than 1 and by using a pixel value at a sampling position in the template prediction image and a pixel value at a sampling position in the template image.

Advantageous Effects of Invention

According to one aspect of the present invention, complexity of the template-based intra mode derivation can be reduced with the accuracy of the prediction image maintained.

BRIEF DESCRIPTION OF DRAWINGS

FIG. 8 is an example of a syntax related to TIMD prediction.

DESCRIPTION OF EMBODIMENTS

First Embodiment

Hereinafter, an embodiment of the present invention will be described with reference to the drawings.

Figure 1:
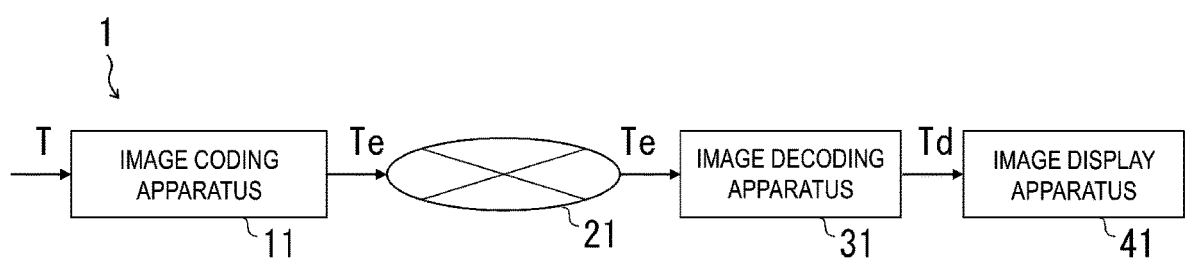
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system in which a coding stream obtained by coding a coding target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily limited to a bi-directional communication network, and may be a unidirectional communication network configured to transmit broadcast waves of digital terrestrial television broadcasting, satellite broadcasting of the like. The network 21 may be substituted by a storage medium in which the coding stream Te is recorded, such as a Digital Versatile Disc (DVD: trade name) or a Blu-ray Disc (BD: trade name).

The video decoding apparatus 31 decodes each of the coding streams Te transmitted from the network 21 and generates one or multiple decoded images Td.

The video display apparatus 41 displays all or part of one or multiple decoded images Td generated by the video decoding apparatus 31. For example, the video display apparatus 41 includes a display device such as a liquid crystal display and an organic Electro-Luminescence (EL) display. Forms of the display include a stationary type, a mobile type, an HMD type, and the like. In a case that the video decoding apparatus 31 has a high processing capability, an image having high image quality is displayed, and in a case that the apparatus has a lower processing capability, an image which does not require high processing capability and display capability is displayed.

Operator

Operators used in the present specification will be described below.

\>\> denote a right bit shift, << denotes a left bit shift, & denotes a bitwise AND, | denotes a bitwise OR, ^ denotes a bitwise XOR, |=denotes an OR assignment operator, ! denotes a logical negation (NOT), && denotes a logical product (AND), and || denotes a logical sum (OR).

x?y:z is a ternary operator that takes y in a case that x is true (other than 0) and takes z in a case that x is false (0).

Clip3 (a, b, c) is a function to clip c in a value equal to or greater than a and less than or equal to b, and a function to return a in a case that c is less than a (c<a), return b in a case that c is greater than b (c>b), and return c in other cases (provided that a is less than or equal to b (a<=b)).

Clip1Y (c) is an operator that sets, in Clip3 (a, b, c), a=0 and b=(1<<BitDepthY)−1. BitDepthY is a bit depth of luminance.

abs (a) is a function that returns the absolute value of a.

Int (a) is a function that returns the integer value of a.

Floor (a) is a function that returns the maximum integer equal to or less than a.

Log2 (a) is a logarithm function that returns a logarithm of a to base 2.

Ceil (a) is a function that returns the minimum integer equal to or greater than a.

a/d represents division of a by d (round down decimal places).

Min (a) is a function that returns a smaller value of a and b.

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 2:
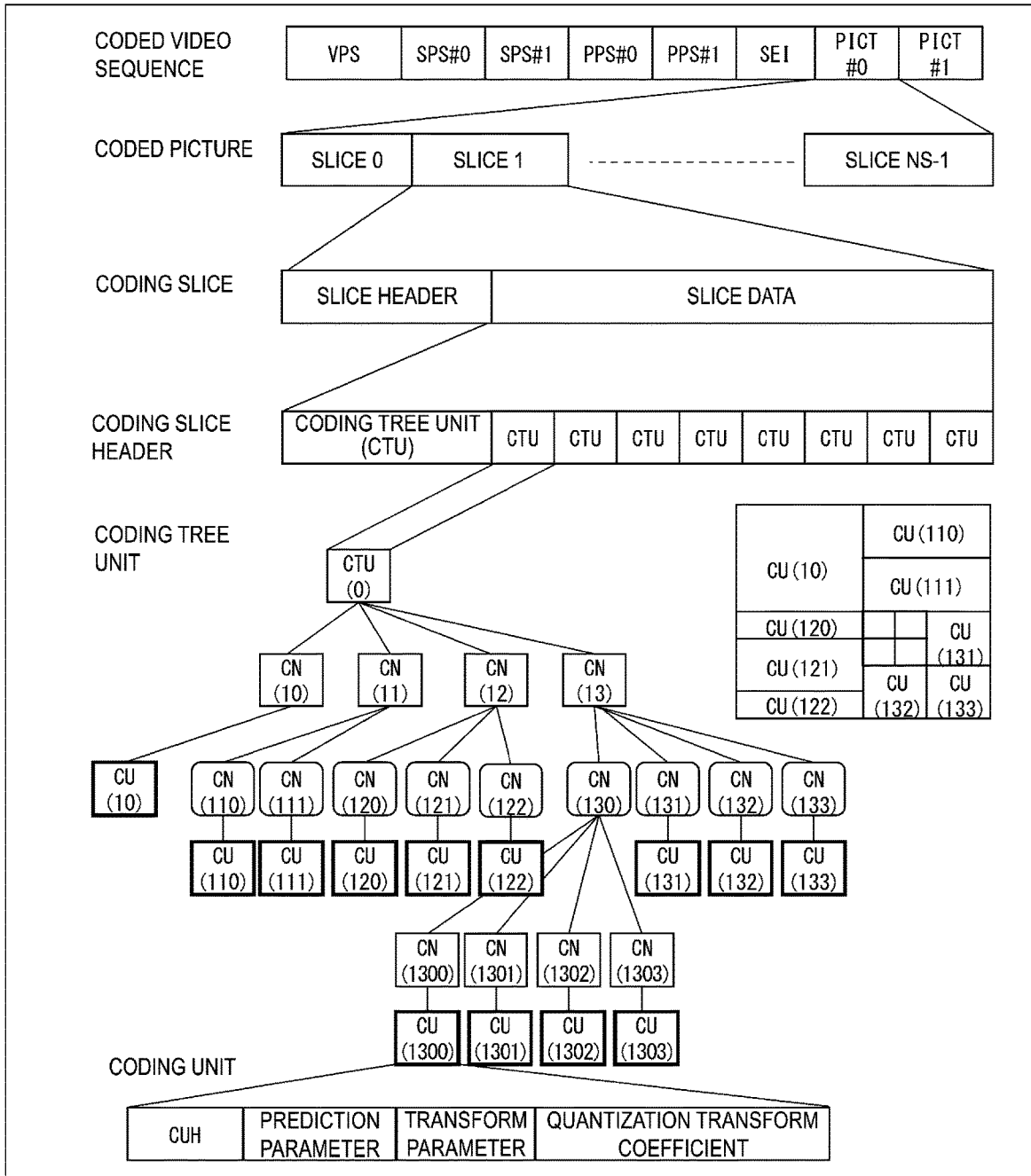
FIG. 2 is a diagram illustrating a hierarchical structure of data of a coding stream.

FIG. 2 is a diagram illustrating the hierarchy structure of data in the coding stream Te. The coding stream Te includes a sequence and multiple pictures constituting the sequence illustratively. FIG. 2 depicts a diagram illustrating a coded video sequence defining a sequence SEQ, a coded picture prescribing a picture PICT, a coding slice prescribing a slice S, a coding slice data prescribing slice data, a coding tree unit included in the coding slice data, and a coding unit included in the coding tree unit.

Coded Video Sequence

In the coded video sequence, a set of data referenced by the video decoding apparatus 31 to decode the sequence SEQ to be processed is defined. As illustrated in the coded video sequence of FIG. 2, the sequence SEQ includes a Video Parameter Set VPS, a Sequence Parameter Set SPS, a Picture Parameter Set PPS, a picture PICT, and Supplemental Enhancement Information SEI.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters referenced by the video decoding apparatus 31 to decode a target sequence is defined. For example, a width and a height of a picture are defined. Note that multiple SPSs may exist. In that case, any of the multiple SPSs is selected from the PPS.

In the picture parameter set PPS, a set of coding parameters referenced by the video decoding apparatus 31 to decode each picture in a target sequence is defined. For example, a reference value (pic_init_qp_minus26) of a quantization step size used for decoding of a picture and a flag (weighted_pred_flag) indicating an application of a weight prediction are included. Note that multiple PPSs may exist. In that case, any of the multiple PPSs is selected from each picture in a target sequence.

Coded Picture

In the coded picture, a set of data referenced by the video decoding apparatus 31 to decode the picture PICT to be processed is defined. As illustrated in a coded picture in FIG. 2, the picture PICT includes a slice 0 to a slice NS−1 (NS is the total number of slices included in the picture PICT).

Note that in a case that it is not necessary to distinguish each of the slice 0 to the slice NS−1 below, subscripts of reference signs may be omitted. The same applies to other data with subscripts included in the coding stream Te which will be described below.

Coding Slice

In the coding slice, a set of data referenced by the video decoding apparatus 31 to decode the slice S to be processed is defined. As illustrated in a coding slice in FIG. 2, the slice includes a slice header and slice data.

The slice header includes a coding parameter group referenced by the video decoding apparatus 31 to determine a decoding method for a target slice. Slice type indication information (slice_type) indicating a slice type is one example of a coding parameter included in the slice header.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like. Note that the inter prediction is not limited to a uni-prediction and a bi-prediction, and the prediction image may be generated by using a larger number of reference pictures. Hereinafter, in a case of being referred to as the P or B slice, a slice that includes a block in which the inter prediction can be used is indicated.

Note that the slice header may include a reference to the picture parameter set PPS (pic_parameter_set_id).

Coding Slice Data

In the coding slice data, a set of data referenced by the video decoding apparatus 31 to decode the slice data to be processed is defined. The slice data includes CTUs as illustrated in the coding slice header in FIG. 2. The CTU is a block of a fixed size (for example, 64×64) constituting a slice, and may also be called a Largest Coding Unit (LCU).

Coding Tree Unit

In the coding tree unit in FIG. 2, a set of data is defined that is referenced by the video decoding apparatus 31 to decode the CTU to be processed. The CTU is split into coding unit CUs, each of which is a basic unit of coding processing, by a recursive Quad Tree split (QT split), Binary Tree split (BT split), or Ternary Tree split (TT split). The BT split and the TT split are collectively referred to as a Multi Tree split (MT split). Nodes of a tree structure obtained by recursive quad tree splits are referred to as Coding Nodes. Intermediate nodes of a quad tree, a binary tree, and a ternary tree are coding nodes, and the CTU itself is also defined as the highest coding node.

Coding Unit

As illustrated in the coding unit in FIG. 2, a set of data is defined that is referenced by the video decoding apparatus 31 to decode the coding unit to be processed. Specifically, the CU includes a CU header CUH, a prediction parameter, a transform parameter, a quantization transform coefficient, and the like. In the CU header, a prediction mode and the like are defined.

There are cases that the prediction processing is performed in units of CU or performed in units of sub-CU in which the CU is further split. In a case that the sizes of the CU and the sub-CU are equal to each other, the number of sub-CUs in the CU is one. In a case that the CU is larger in size than the sub-CU, the CU is split into sub-CUs. For example, in a case that the CU has a size of 8×8, and the sub-CU has a size of 4×4, the CU is split into four sub-CUs which include two horizontal splits and two vertical splits.

There are two types of predictions (prediction modes), which are intra prediction and inter prediction. The intra prediction refers to a prediction in an identical picture, and the inter prediction refers to prediction processing performed between different pictures (for example, between pictures of different display times, and between pictures of different layer images).

Transform and quantization processing is performed in units of CU, but the quantization transform coefficient may be subjected to entropy coding in units of subblock such as 4×4.

Prediction Parameter

A prediction image is derived by prediction parameters accompanying a block. The prediction parameters include prediction parameters for intra prediction and inter prediction.

Figure 3:
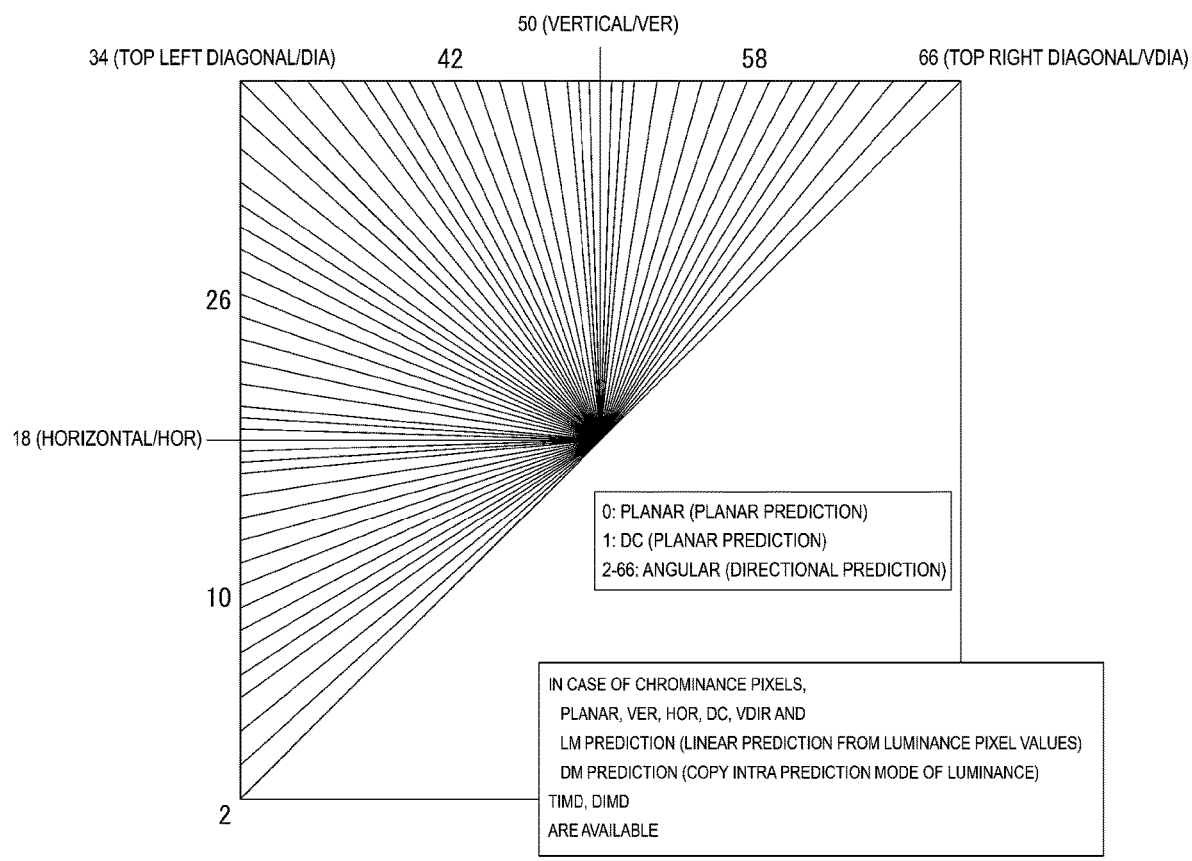
FIG. 3 is a schematic diagram illustrating types (mode numbers) of an intra prediction mode.

The prediction parameters for intra prediction will be described below. The intra prediction parameters include a luminance prediction mode IntraPredModeY and a chrominance prediction mode IntraPredModeC. FIG. 3 is a schematic diagram illustrating types (mode numbers) of an intra prediction mode. As illustrated in FIG. 3, the intra prediction mode includes, for example, 67 types (0 to 66). For example, there are planar prediction (0), DC prediction (1), and Angular prediction (2 to 66). In addition, linear model (LM) prediction may be used such as Cross Component Linear Model (CCLM) prediction or Multi Mode Linear Model (MMLM) prediction. Furthermore, for chrominance, an LM mode may be added. Template-based Intra Mode Derivation (TIMD) prediction or Decoder Intra Mode Derivation (DIMD) prediction may also be used.

Configuration of Video Decoding Apparatus

Figure 4:
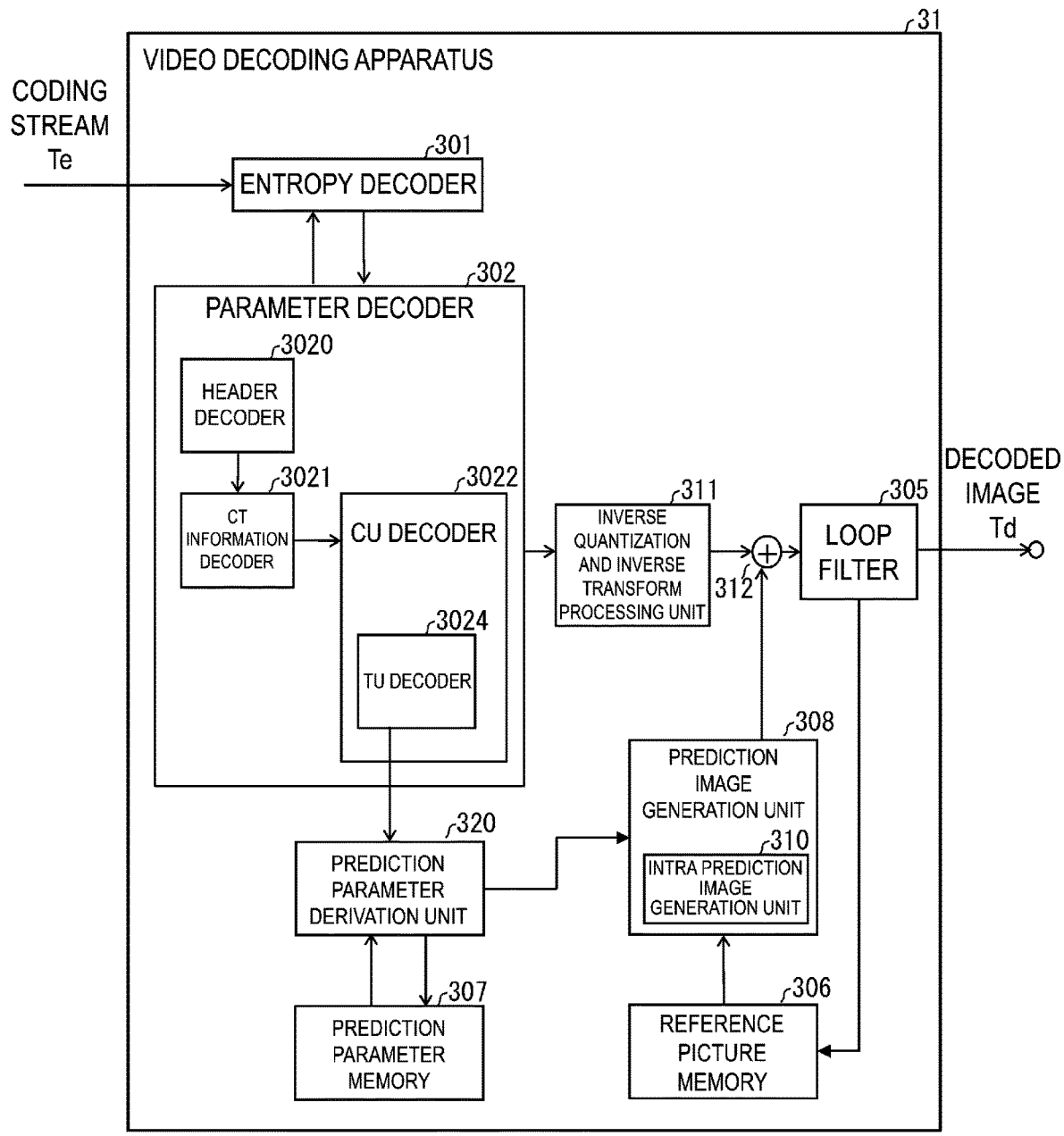
FIG. 4 is a schematic diagram illustrating a configuration of a video decoding apparatus.

The configuration of the video decoding apparatus 31 (FIG. 4) according to the present embodiment will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, an addition unit 312, and a prediction parameter derivation unit 320. Note that a configuration in which the loop filter 305 is not included in the video decoding apparatus 31 may be used in accordance with the video coding apparatus 11 described later.

The parameter decoder 302 further includes a header decoder 3020, a CT information decoder 3021, and a CU decoder 3022 (prediction mode decoder), and the CU decoder 3022 further includes a TU decoder 3024. These may be collectively referred to as a decoding module. The header decoder 3020 decodes, from coded data, parameter set information such as the VPS, the SPS, the PPS, and an APS, and a slice header (slice information). The CT information decoder 3021 decodes a CT from coded data. The CU decoder 3022 decodes a CU from coded data. In a case that a TU includes a prediction error, the TU decoder 3024 decodes QP update information (quantization correction value) and quantization prediction error (residual_coding) from coded data.

In the mode other than the skip mode (skip_mode==0), the TU decoder 3024 decodes QP update information and quantization prediction error from coded data. More specifically, the TU decoder 3024 decodes, in a case of skip_mode==0, a flag cu_cbp indicating whether a quantization prediction error is included in the target block, and decodes the quantization prediction error in a case that cu_cbp is 1. In a case that cu_cbp is not present in the coded data, the TU decoder 3024 derives cu_cbp as 0.

The prediction image generation unit 308 includes an inter prediction image generation unit 309 and an intra prediction image generation unit 310.

The prediction parameter derivation unit 320 includes an inter prediction parameter derivation unit 303 and an intra prediction parameter derivation unit 304.

An example in which a CTU and a CU are used as units of processing is described below, but the processing is not limited to this example, and processing in units of sub-CU may be performed. Alternatively, the CTU and the CU may be replaced with a block, the sub-CU may be replaced with by a subblock, and processing may be performed in units of blocks or subblocks.

The entropy decoder 301 performs entropy decoding on the coding stream Te input from the outside and separates and decodes individual codes (syntax elements). The entropy coding includes a scheme (Context Adaptive Binary Arithmetic Coding; CABAC) in which syntax elements are subjected to variable-length coding by using a context (probability model) that is adaptively selected according to a type of the syntax elements and a surrounding condition, and a scheme in which syntax elements are subjected to variable-length coding by using a predetermined table or a predetermined calculation expression. The entropy decoder 301 initializes all CABAC states at the beginning of a segment (tile, CTU row, or slice). The entropy decoder 301 transforms the syntax element into a binary string (Bin String) and decodes each bit of the Bin String. In a case that the context is used, a context index ctxInc is derived for each bit of the syntax element, the bit is decoded using the context, and the CABAC state of the context used is updated. Bits that do not use the context are decoded at an equal probability (EP, bypass), and the ctxInc derivation and CABAC state are omitted.

The entropy decoder 301 outputs the decoded codes to the parameter decoder 302. Which code is to be decoded is controlled based on an indication of the parameter decoder 302.

Configuration of Intra Prediction Parameter Derivation Unit 304

The intra prediction parameter derivation unit 304 decodes an intra prediction parameter, for example, an intra prediction mode IntraPredMode, with reference to the prediction parameters stored in the prediction parameter memory 307, based on a code input from the entropy decoder 301. The intra prediction parameter derivation unit 304 outputs the decoded intra prediction parameter to the prediction image generation unit 308, and stores the decoded intra prediction parameter in the prediction parameter memory 307. The intra prediction parameter derivation unit 304 may derive different intra prediction modes between luminance and chrominance.

The intra prediction parameter derivation unit 304 decodes the syntax elements related to intra prediction as illustrated in FIG. 8.

The loop filter 305 is a filter provided in the coding loop, and is a filter that removes block distortion and ringing distortion and improves image quality. The loop filter 305 applies a filter such as a deblocking filter, a Sample Adaptive Offset (SAO), and an Adaptive Loop Filter (ALF) on a decoded image of a CU generated by the addition unit 312.

The reference picture memory 306 stores a decoded image of the CU generated by the addition unit 312 in a predetermined position for each target picture and target CU.

The prediction parameter memory 307 stores a prediction parameter in a position predetermined for each CTU or CU to be decoded. Specifically, the prediction parameter memory 307 stores a parameter decoded by the parameter decoder 302, the prediction mode predMode separated by the entropy decoder 301, and the like.

To the prediction image generation unit 308, the prediction mode predMode, the prediction parameter, and the like are input. In addition, the prediction image generation unit 308 reads a reference picture from the reference picture memory 306. The prediction image generation unit 308 generates a prediction image of a block or a subblock by using the prediction parameter and the read reference picture (reference picture block) in the prediction mode indicated by the prediction mode predMode. Here, the reference picture block refers to a set of pixels (referred to as a block because they are normally rectangular) on a reference picture and is a region that is referenced for generating a prediction image.

Intra Prediction Image Generation Unit 310

In a case that prediction mode predMode indicates an intra prediction mode, the intra prediction image generation unit 310 performs intra prediction by using an intra prediction parameter input from the intra prediction parameter derivation unit 304 and a reference picture read out from the reference picture memory 306.

Specifically, the intra prediction image generation unit 310 reads, from the reference picture memory 306, adjacent blocks located on the target picture within a prescribed range from the target block. The prescribed range corresponds to a left, an upper left, a lower left, an upper, and an upper right adjacent blocks of the target block, and the referenced area varies depending on the intra prediction mode.

The intra prediction image generation unit 310 references decoded pixel values read out and the prediction mode indicated by IntraPredMode to generate a prediction image of the target block. The intra prediction image generation unit 310 outputs the generated prediction image of the block to the addition unit 312.

The generation of the prediction image based on the intra prediction mode will be described below. In the Planar prediction, DC prediction, and Angular prediction, decoded peripheral regions adjacent to (proximate to) the prediction target block are set as a reference region R. Then, the pixels on the reference region R are extrapolated in a particular direction to generate the prediction image. For example, the reference region R may be configured as an L-shaped region including a left and an upper regions (or further an upper left, an upper right, and a lower left regions) of the prediction target block.

Details of Prediction Image Generation Unit

Figure 5:
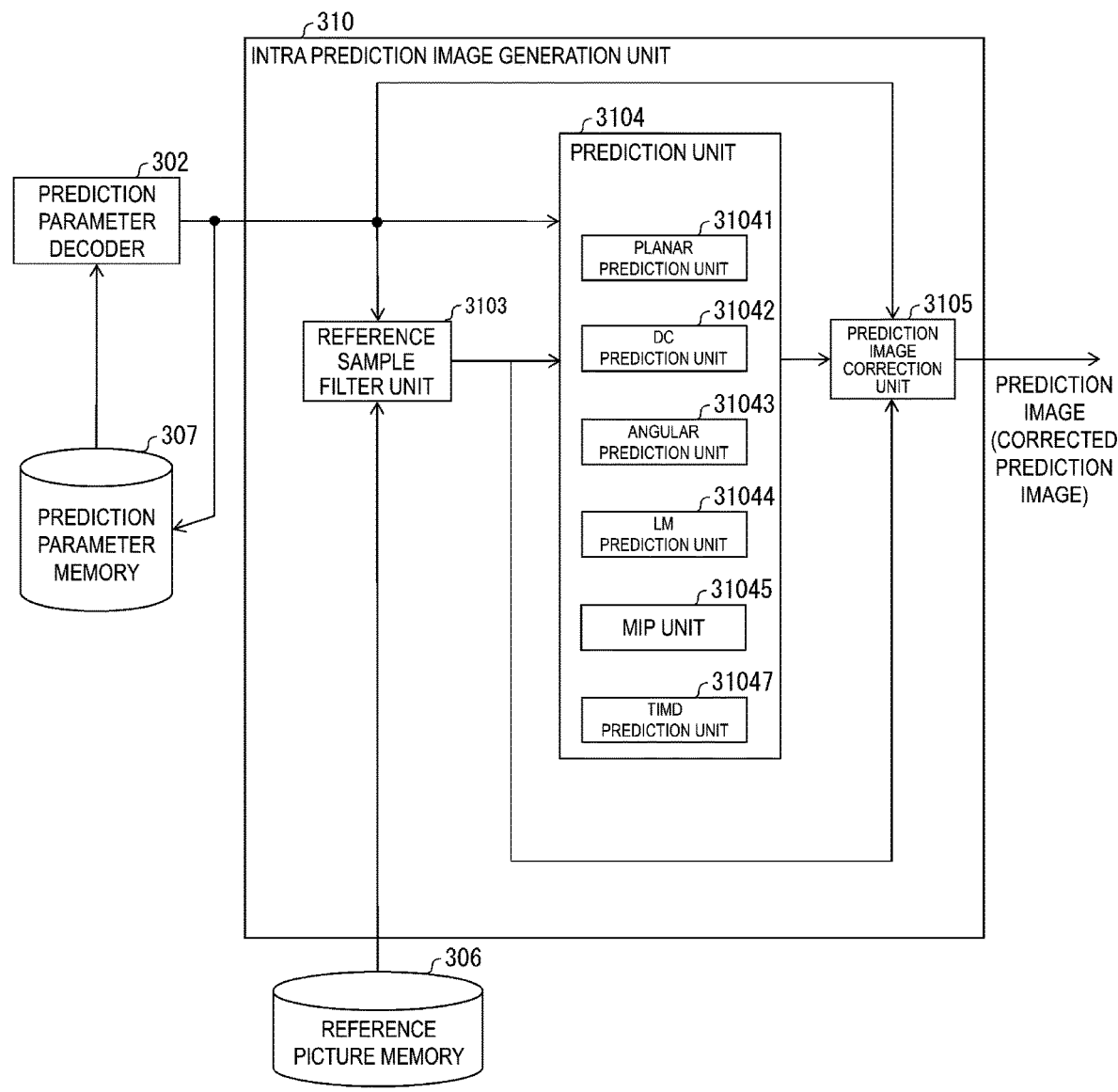
FIG. 5 is a schematic diagram illustrating a configuration of an intra prediction image generation unit.

Now, the details of the configuration of the intra prediction image generation unit 310 will be described with reference to FIG. 5. The intra prediction image generation unit 310 includes a reference sample filter unit 3103 (second reference image setting unit), a prediction unit 3104, and a prediction image correction unit 3105 (prediction image correction unit, filter switching unit, weighting factor change unit).

Based on each reference pixel (reference image) on the reference region R, a filtered reference image generated by application of a reference sample filter (first filter), and the intra prediction mode, the prediction unit 3104 generates a prediction image of a prediction target block (temporary prediction image, uncorrected prediction image) and outputs the prediction image to the prediction image correction unit 3105. The prediction image correction unit 3105 modifies the temporary prediction image in accordance with the intra prediction mode, generates a prediction image (corrected prediction image), and outputs the prediction image.

Units of the intra prediction image generation unit 310 will be described below.

Reference Sample Filter Unit 3103

The reference sample filter unit 3103 derives a reference sample recSamples [x][y] at each position (x, y) on the reference region R with reference to the reference image. The reference sample filter unit 3103 applies the reference sample filter (first filter) to the reference sample recSamples [x][y] in accordance with the intra prediction mode to update the reference sample recSamples [x][y] at each position (x, y) on the reference region R (derive a filtered reference image recSamples[x][y]). Specifically, the low pass filter is applied to the position (x, y) and the reference images surrounding the position to derive the filtered reference image. Note that the low pass filter is not necessarily applied to all of the intra prediction modes, and the low pass filter may be applied to some of the intra prediction modes. Note that the filter to be applied to the reference image on the reference region R in the reference sample filter unit 3103 is referred to as the "reference sample filter (first filter)", whereas a filter for correcting the temporary prediction image in the prediction image correction unit 3105 described below is referred to as a "position dependent filter (second filter)".

Configuration of Prediction Unit 3104

Based on the intra prediction mode, the reference image, and the filtered reference pixel value, the prediction unit 3104 generates a temporary prediction image (temporary prediction pixel value, uncorrected prediction image) of the prediction target block, and outputs the temporary prediction image to the prediction image correction unit 3105. The prediction unit 3104 includes a Planar prediction unit 31041, a DC prediction unit 31042, an Angular prediction unit 31043, an LM prediction unit 31044, a Matrix-based Intra Precision (MIP) unit 31045, and a Template-based Intra Mode Derivation (TIMD) prediction unit 31047. The prediction unit 3104 selects a specific prediction unit in accordance with the intra prediction mode, and receives input of the reference image and the filtered reference image. The relationship between the intra prediction mode and the corresponding prediction unit is as follows.

Planar prediction . . . Planar Prediction unit 31041
DC Prediction . . . DC prediction unit 31042
Angular prediction . . . Angular prediction unit 31043
LM prediction . . . LM prediction unit 31044
Matrix intra prediction . . . MIP unit 31045
TIMD prediction . . . TIMD prediction unit 31047

Planar Prediction

The Planar prediction unit 31041 linearly adds reference samples recSamples[x][y] together in accordance with the distance between a prediction target pixel position and a reference pixel position to generate a temporary prediction image predSamples[x][y], and outputs the temporary prediction image predSamples[x][y] to the prediction image correction unit 3105.

DC Prediction

The DC prediction unit 31042 derives a DC prediction value corresponding to the average value of the reference samples recSamples[x][y], and outputs the temporary prediction image predSamples[x][y] having the DC prediction value as a pixel value.

Angular Prediction

The Angular prediction unit 31043 generates a temporary prediction image predSamples[x][y] using the reference samples recSamples[x][y] in the prediction direction (reference direction) indicated by the intra prediction mode, and outputs the temporary prediction image to the prediction image correction unit 3105.

In the case of IntraPredMode>=DIR $ref[x]=recSamples[-1-refIdx+x][-1-refIdx]$
$(x=0 \ldots bW+refIdx+1)$ Furthermore, the following is performed on x=0 . . . bW−1, y=0 . . . bH−1.

$iIdx=(((y+1+refIdx)*intraPredAngle)>>5)+refIdx$ $iFact=((y+1+refIdx)*intraPredAngle)\& 31$ $predSamples[x][y]=Clip1(((\Sigma(fT[i]*ref[x+iIdx+i]))+32)>>6)$ Otherwise, (IntraPredMode<DIR)

$ref[x]=recSamples[-1-refIdx][-1-refIdx+x]$
$(x=0 \ldots bH+refIdx+1)$

Furthermore, the following is performed on x=0 . . . bW−1, y=0 . . . bH−1.

$iIdx=(((x+1+refIdx)*intraPredAngle)>>5)+refIdx$ $iFact=((x+1+refIdx)*intraPredAngle)\& 31$ $predSamples[x][y]=Clip1((( /(fT[i]*ref[y+iIdx+i]))+32)>>6)$ DIR and refIdx represent prescribed constants. For example, DIR=34, 66, or the like. refIdx=0, 1, 2, or the like. For normal angular prediction, refIdx may be set by decoding the syntax of coded data. fT represents an interpolation filter coefficient for an intra prediction image. In the case of generation of a prediction image for TIMD prediction described below, refIdx=0 may be fixed. In a case that refIdx is used to generate a template prediction image, refIdx=2 or 4 may be used.

LM Prediction

The LM prediction unit 31044 predicts a chrominance pixel value based on a luminance pixel value. Specifically, in this scheme, based on a decoded luminance image, a linear model is used to generate a prediction image of a chrominance image (Cb, Cr). One of the LM predictions is Cross-Component Linear Model (CCLM) prediction. The CCLM prediction is a prediction scheme that uses, for one block, a linear model for predicting chrominance from luminance.

Matrix Intra Prediction

The MIP unit 31045 generates a temporary prediction image predSamples[x][y] by a product-sum operation of a weighting matrix and a reference sample recSamples[x][y] derived from an adjacent region, and outputs a temporary prediction image to the prediction image correction unit 3105.

TIMD Prediction

The TIMD prediction is a prediction scheme that generates a temporary prediction image by using an intra prediction mode that is not explicitly signaled. The intra prediction parameter derivation unit 304 first generates a template prediction image of a template image corresponding to an adjacent region of a target block from which an intra prediction mode candidate is to be derived. Then, an image of a reference region (template reference region) near the target block is used to generate a template prediction image for multiple intra prediction mode candidates. Then, as the TIMD intra prediction mode of the target block, the intra prediction mode candidate is selected that is used for derivation of a template prediction image with the minimum cost (e.g., difference absolute value sum) of the template image and the template prediction image. The TIMD prediction unit 31047 generates a prediction image (temporary prediction image) by using this TIMD intra prediction mode. Details will be described below.

Configuration of Prediction Image Correction Unit 3105

The prediction image correction unit 3105 modifies the temporary prediction image output from the prediction unit 3104 in accordance with the intra prediction mode. Specifically, the prediction image correction unit 3105 derives, for each pixel of the temporary prediction image, a position dependent weighting factor depending on the positions of the reference region R and the target prediction pixel. Then, the reference sample recSamples[ ][ ] and the temporary prediction image predSamples[x][y] are added together with weighting (weighted average) to derive a prediction image (corrected prediction image) Pred[ ][ ] corresponding to a modified temporary prediction image. Note that in some intra prediction modes, the temporary prediction image predSamples[x][y] may be set as a prediction image without being corrected by the prediction image correction unit 3105.

First Example

FIG. 8 illustrates an example syntax of coded data related to TIMD. The parameter decoder 302 decodes the coded data into a flag timd_flag indicating whether the TIMD is used for each block. If timd_flag is equal to 1, the parameter decoder 302 does not need to decode, from the coded data, some syntax elements related to the intra prediction mode. If timd_flag is equal to 0, intra_luma_mpm_flag is decoded. intra_luma_mpm_flag is a flag indicating whether to derive an intra prediction mode from a prediction candidate list candModeList (Most Probable Mode (MPM) list). If intra_luma_mpm_flag is equal to 1, intra_luma_not_planar_flag and intra_luma_mpm_idx are decoded. If intra_luma_mpm_flag is equal to 0, intra_luma_mpm_reminder is decoded. intra_not_planar_flag is a flag indicating whether to perform planar prediction. intra_luma_mpm_idx is an index that indicates, as a prediction candidate, one of the intra prediction modes stored in the MPM list candModeList[ ]. intra_luma_mpm_reminder is an index that selects a prediction candidate from intra prediction modes other than those in the MPM list.

For example, the target block is assumed to have upper left coordinates (xC, yC), a block width bW, and a block height bH. With the intraPredMode of a block A adjacent to the target block on the left being used as intraPredModeA and with the intraPredMode of a block B adjacent to the target block above being used as intraPredModeB, prediction mode candidates for the target block may be derived as follows. Block A (hereinafter referred to as A) is a block including coordinates (xC−1, yC+bH−1). Block B (hereinafter referred to as B) is a block including coordinates (xC+bW−1, yC−1).

candModePredModeA=(A is not available||A is other than MODE INTRA)?INTRA_PLANAR:intraPredModeA candModePredModeB=(B is not available||B is other than MODE INTRA||B is positioned above an upper CTU boundary of the target block)?INTRA_PLANAR:intraPredModeB Note that whether B is positioned above the CTU boundary can be determined depending on whether yC−1< ((yC>>CtbLog2SizeY)<<CtbLog2SizeY) is true or false. Here, CtbLog2SizeY=Log2 (CTU size). A syntax element sps_log2_ctu_size_minus5 in the encoded data may be decoded for derivation in accordance with CtbLog2SizeY=sps_log2_ctu_size_minus5+5. candModeList may be derived as follows.

candModeList[0]=candIntraPredModeA candModeList[1]=candIntraPredModeB minAB=Min(candIntraPredModeA,candIntraPredModeB)

candModeList[2]=2+((minAB+61)% 64)

candModeList[3]=2+((minAB−1)% 64)

candModeList[4]=2+((minAB+60)% 64)

If timd_flag is equal to 1, the TIMD prediction unit 31047 generates a template prediction image for the intra prediction mode candidate using an image of the template reference region near the target block, and selects a preferable intra prediction mode for a prediction image of the template image of the target block.

Figure 6:
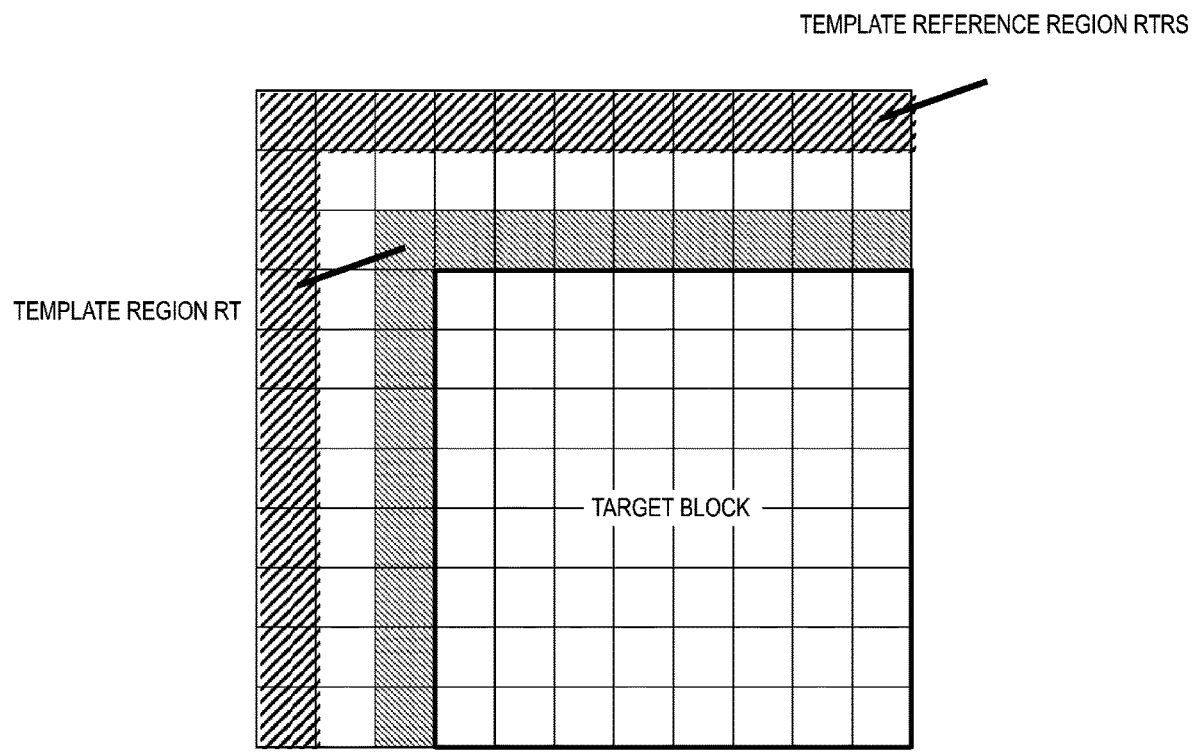
FIG. 6 is a diagram illustrating a relationship between a target block and a template region and a template reference region.

FIG. 6 illustrates a template region RT and a template reference region (template reference sample region) RTRS referenced in the TIMD prediction. The template region is a region in the template image. The template reference region is a region referenced when a template prediction image is generated that corresponds to a prediction image of the template image.

Figure 7:
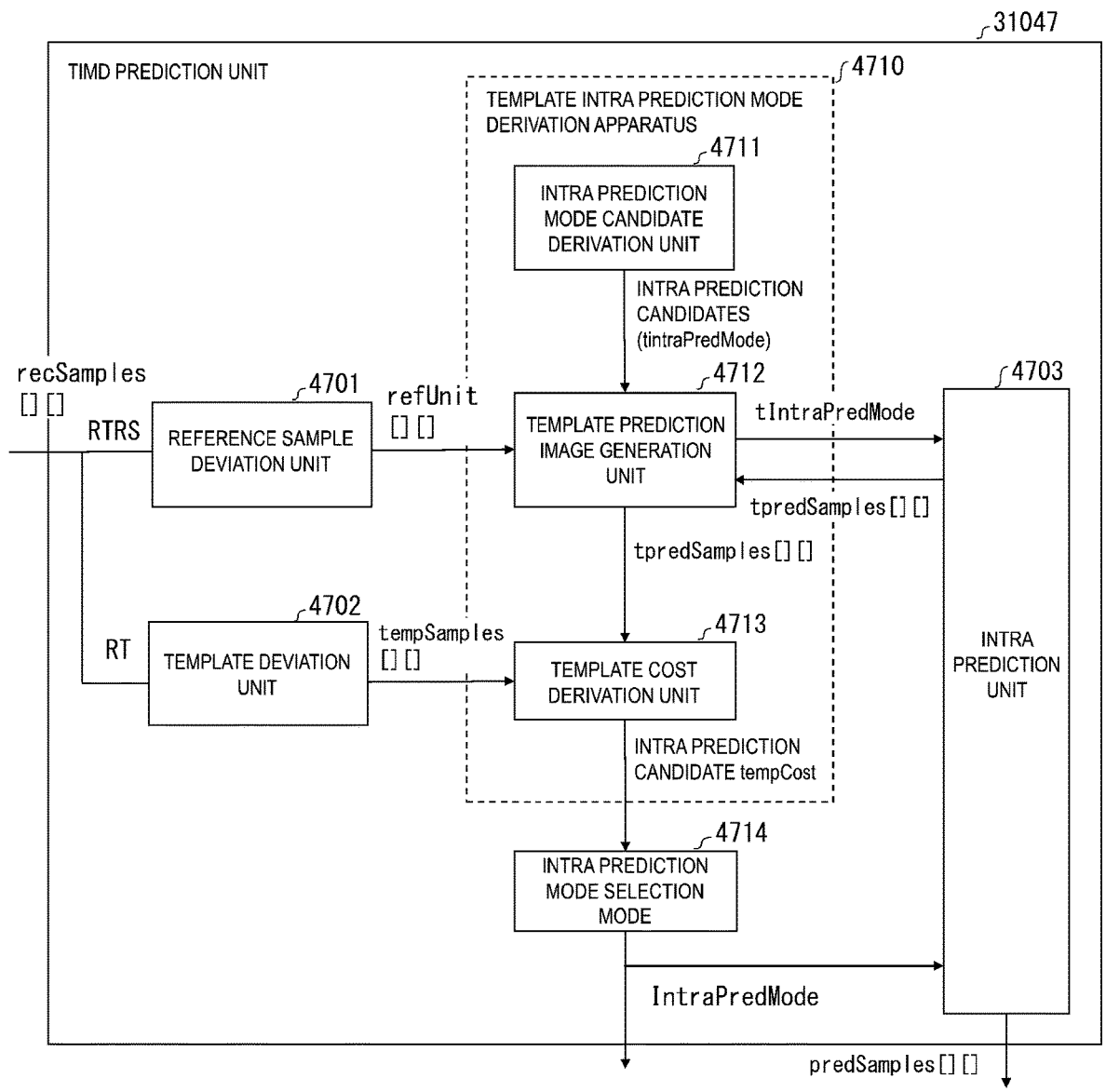
FIG. 7 is a diagram illustrating details of a TIMD prediction unit.

FIG. 7 illustrates a configuration of the TIMD prediction unit 31047 in the present embodiment. The TIMD prediction unit 31047 includes a reference sample derivation unit 4701, a template derivation unit 4702, an intra prediction unit 4703, an intra prediction mode candidate derivation unit 4711, a template prediction image generation unit 4712, a template cost derivation unit 4713, and an intra prediction mode selection unit 4714. Note that the intra prediction mode candidate derivation unit 4711, the template prediction image generation unit 4712, the template cost derivation unit 4713 may be collectively referred to as a template intra prediction mode derivation apparatus 4710.

The intra prediction mode candidate derivation unit 4711 derives a list timdModeList[ ] of intra prediction mode candidates from intra prediction modes of adjacent blocks of the target block. For example, the MPM list candModeList[ ] may be used as timdModeList.

timdModeList[i]=candModeList[i](i=0 . . . the number of elements in candModeList−1)

The template derivation unit 4702 derives a template image tempSamples of the target block. As illustrated in FIG. 6, the template image tempSamples may be derived from an L-shaped template region RT of one-pixel width adjacent to the target block.

tempSamples[x+i][y+j]=recSamples[xC+i][yC+j]
(i=−1 . . . bW−1,j=−1),(i=−1,j=−1 . . . bH−1)

The region on recSamples used for deriving tempSamples is referred to as the template region RT, and is expressed as a set of coordinates (i, j). In other words, RT={{i=−1 . . . bW−1, j=−1}, {i=−1, j=−1 . . . bH−1}}. Instead of using tempSamples, an array of decoded images recSamples corresponding to the template region may be used as a template image (in this case, the region in which tempSamples is positioned is referred to as a template region).

Alternatively, the template region may be an L-shaped region of two-pixel width adjacent to the target block.

tempSamples[x+i][y+j]=recSamples[xC+i][yC+j]
(i=−2 . . . bW−1,j=− . . . −1),(i=−2 . . . −1,j=−2 . . . bH−1)

The reference sample derivation unit 4701 derives a reference sample refUnit from the template reference region RTRS. Note that the reference sample filter unit 3103 may perform the operation of the reference sample derivation unit 4701.

refUnit[$x$][$y$]=recSamples[$x$NbCmp+$x$][$y$NbComp+$y$]

Here, xNbCmp=xC and yNbCmp=yC, and x and y range as follows: x=−1−refIdxW and y=−1−refIdxH . . . refH−1, and x=−1−refIdxW . . . refW−1 and y=−1−refIdxH. Here, refIdxW and refIdxH are distances of the template reference region from the target block boundary. refIdxW=refIdxH=2 or 4 may be set or refIdxW and refIdxH may vary depending on the block size.

refIdx$W$=refIdx$H$=($bW$>=8)&&($bH$>=8)?4:2

Here, refW=bW*2 and refH=bH*2.

Furthermore, the reference sample refUnit[x][y] may be filtered to derive a reference sample p[x][y].

The template prediction image generation unit 4712 generates a prediction image (template prediction image) of the intra prediction mode IntraPredMode from the template reference region. The prediction unit 3104 may perform prediction image generation instead of the template prediction image generation unit 4712. For example, the Planar prediction unit 31041, the DC prediction unit 31042, and the Angular prediction unit 31043 may perform both generation of a template prediction image and generation of a prediction image of the target block.

Specifically, for each of the intra modes intraPredMode included in timdModeList[i] (tIntraPredMode=timdModeList[i]), the Planar prediction unit 31041, the DC prediction unit 31042, and the Angular prediction unit 31043 generate a one-dimensional reference pixel array ref[ ] from the reference sample refUnit[x][y] or the filtered reference sample p[x][y]. Then, the Planar prediction unit 31041, the DC prediction unit 31042, and the Angular prediction unit 31043 transmit tIntraPredMode and ref[ ] to the intra prediction unit 4703. The intra prediction unit 4703 generates a template prediction image tpredSamples [ ][ ] corresponding to tIntraPredMode, and outputs the template prediction image tpredSamples[ ][ ] to the template prediction image generation unit 4712.

The template prediction image generation unit 4712 generates ref[ ], for example, as indicated in (Formula TIMD-ANGULAR-REF) below. In the formula, tpredSamples[ ][ ] is generated from p[ ]. However, instead of p[ ][ ], refUnit[ ][ ] may be used.

Formula TIMD-ANGULAR-REF

In a case of tIntraPredMode>=DIR ref[$x$]=$p$[−1−refIdx+$x$][−1−refIdx],($x$=0 . . . $bW$+refIdx+1)

Otherwise (tIntraPredMode<DIR)

ref[$x$]=$p$[−1−refIdx][−1−refIdx+$x$],($x$=0 . . . $bH$+refIdx+1)

DIR is a prescribed constant, For example, DIR=34, 66, or the like. Here, refIdx is a distance from the target block. The template region has refIdx=0 (or 1) and the template reference region for which an image of the template region is used for prediction uses refIdx>0 (e.g., refIdx=2, 4, or the like). refIdx may be changed depending on the block size.

refIdx=($bW$>=8)&&($bH$>=8)?4:2

The template prediction image generation unit 4712 (intra prediction unit 4703) generates a template prediction image tpredSamples[ ][ ] corresponding to tIntraPredMode, for example, as indicated in (Formula TIMD-ANGULAR-PRED) below.

Formula TIMD-ANGULAR-PRED

In a case of tIntraPredMode>=DIR $i$Idx=((($y$+1 refIdx)*intraPredAngle)>>5)+refIdx $i$Fact=(($y$+1+refIdx)*intraPredAngle)& 31

$t$predSamples[$x$][$y$]=Clip1((Σ(filt[$i$]*ref[$x$+$i$Idx+$i$])+32)>>6)

Otherwise (tIntraPredMode<DIR)

$i$Idx=((($x$+1 refIdx)*intraPredAngle)>>5)+refIdx $i$Fact=(($x$+1+refIdx)*intraPredAngle)&31

$t$predSamples[$x$][$y$]=Clip1((Σ(filt[$i$]*ref[$y$+$i$Idx+$i$])+32)>>6)

x=−1 . . . bW−1, y=−1 and x=−1, y=−1 . . . bH−1.

Here, Σ is the sum with i=0 . . . MTAP−1, and felt represents an interpolation filter coefficient for the template prediction image. The number of taps MTAP of the interpolation filter used to derive the template prediction image is, for example, 4. intraPredAngle is an angular parameter for each intra prediction mode.

filt may be derived from iFast as follows: filtG[phase][j] is a coefficient for the interpolation filter used to generate a template prediction image.

filt[$j$]=filt$G$[$i$Fact][$j$]

The template cost derivation unit 4713 derives the cost tempCost of an intra prediction mode candidate from the difference between the template prediction image tpredSamples of each intra prediction mode candidate and the template image tempSamples of the target block. The cost may be the Sum of Absolute Difference (SAD).

tempCost=Σ abs($t$predSamples[$i$][$j$]−tempSamples[$i$][$j$])

(i, j) is, for example, (i=−1 . . . bW−1, j=−1), (i=−1, j=−1 . . . bH−1))

Alternatively, the cost may be the Sum of Absolute Transformed Difference (SATD).

The intra prediction mode selection unit 4714 derives the intra prediction mode corresponding to the minimum value of tempCost as the TIMD intra prediction mode IntraPredMode.

The intra prediction unit 4703 derives the intra prediction image predSamples[ ] [ ] corresponding to IntraPredMode derived above. Then, the intra prediction unit 4703 outputs the intra prediction image predSamples[ ] as an intra prediction image of the target block. Note that computation of ref[ ] can be omitted by storing ref[ ] corresponding to each intra prediction mode input from the template prediction image generation unit 4712. Note that the prediction unit 3104 may derive ref[ ].

Formula INTRA-ANGULAR-PRED if (intraPredMode>=DIR)

$i$Idx=((($y$+1)*intraPredAngle)>>5)

$i$Fact=(($y$+1)*intraPredAngle)& 31 predSamples[$x$][$y$]=Clip1((Σ($fT$[$i$]*ref[$x$+$i$Idx+$i$])+32>>6)

else /*intraPredMode<DIR*/

$iIdx=(((x+1)*intraPredAngle)>>5)$ $iFact=((x+1)*intraPredAngle)\& 31$ $predSamples[x][y]=Clip1((\Sigma(fT[i]*ref[y+iIdx+i])+32)>>6)$ Here, Σ is the sum with i=0 . . . NTAP−1. and fT represents an interpolation filter coefficient for the intra prediction image. The number of taps NTAP of the interpolation filter used for deriving the intra prediction image is 6, for example.

fT may also be derived from iFast as follows: fG[phase][j] is the coefficient of interpolation filter for generating the intra prediction image.

$fT[j]=fG[iFact][j]$

Block Size-Specific Template Reference Region

In another configuration, the distances refIdxW and refIdxH from the target block with respect to the template reference region RTRS of the reference sample derivation unit 4701 and ref of the template prediction image generation unit 4712 may be varied depending on the horizontal direction or the vertical direction.

$refIdxW=(bW>=8)?4:2$ $refIdxH=(bW>=8)?4:2$

In a case of tIntraPredMode>=DIR $ref[x]=p[-1-refIdxW+x][-1-refIdxH],$
$(x=0 \ldots bW+refIdxW+1)$ Otherwise (tIntraPredMode<DIR)

$ref[x]=p[-1-refIdxW][-1-refIdxH+x],$
$(x=0 \ldots bH+refIdxH+1)$

The template prediction image generation unit 4712 may perform the following.
Formula TIMD-ANGULAR-PRED
In a case of tIntraPredMode>=DIR $iIdx=(((y+1+refIdxH)*intraPredAngle)>>5)+refIdxH$ $iFact=((y+1+refIdxH)*intraPredAngle)\&31$ $tpredSamples[x][y]=Clip1((\Sigma(filt[i]*ref[x+iIdx+i])+32)>>6)$ Otherwise (tIntraPredMode<DIR)

$iIdx=(((x+1+refIdxW)*intraPredAngle)>>5)+refIdxW$ $iFact=((x+1+refIdxW)*intraPredAngle)\& 31$ $tpredSamples[x][y]=Clip1((\Sigma(filt[i]*ref[y+iIdx+i])+32)>>6)$ x=−1 . . . bW−1, y=−1 and x=−1, y=−1 . . . bH−1.

According to the configuration described above, the region referenced in the template prediction image is varied according to the size of the target block. This improves the accuracy of the template prediction image to improve the accuracy of the TIMD intra prediction image.

In the TIMD prediction in which the template prediction image (intra prediction image) is repeatedly derived by using multiple intra prediction candidates for the target block, the configuration described above is effective in reducing the amount of processing for deriving the prediction image of the template image.

Configuration of Subsampling

Figure 9A:
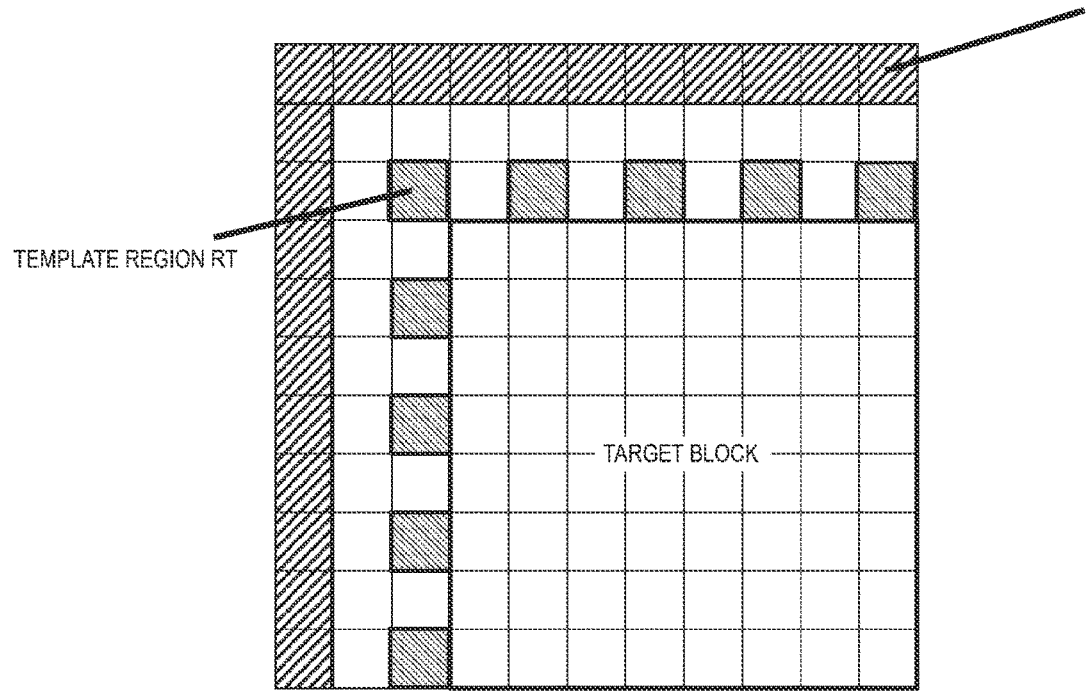
FIGS. 9A and 9B illustrate TIMD prediction utilizing subsampling.
Figure 9B:
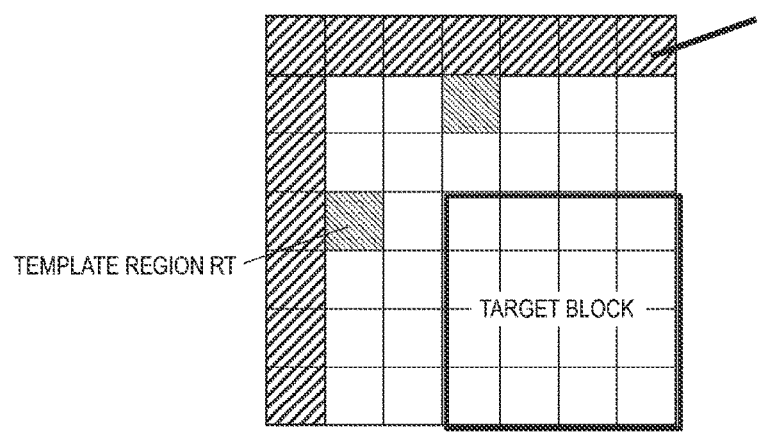

FIGS. 9A and 9B are diagram illustrating the TIMD prediction utilizing sub-sampling.

The template cost derivation unit 4713 may derive the cost of each intra prediction mode candidate from the difference between the pixel value at a sub-sampling position in tpredSamples and the pixel value at the same sub-sampling position in the template region of tempSamples. tpredSamples is a template prediction image, and tempSamples is a template of the target block. The template region of tempSamples may be, for example, (i=−1 . . . bW−1, j=−1), (i=1, j=−1 . . . bH−1) as illustrated in FIG. 9A. The sub-sampled position means discrete positions or positions with discontinuous pixels. The cost may be the Sum of Absolute Difference (SAD).

$tempCost=\Sigma abs(tpredSamples[is][js]-tempSamples[is][js])$

For example (is, js)=(−1+2*i, −1) and (−1, −1+2*j), where i=0 . . . bW/2 and j=0 . . . bH/2.

In this case, when tpredSamples[ ][ ] is derived from ref[ ] indicated in (Formula TIMD-ANGULAR-PRED), only the intra prediction images at the sub-sampled positions need to be derived, leading to a reduced amount of processing. The configuration described above can also be represented as follows.

Among the pixels of the template image, only the pixels of (−1+2*i, −1) and (−1, −1*2j) are used for cost computation.

$tempCost=\Sigma abs(tpredSamples[-1+2*i][-1]-tempSamples[-1+2*i][-1])+\Sigma abs(tpredSamples[-1][-1+2*j]-tempSamples[-1][-1+2*j])$ Here, i=0 . . . bW/2 and j=0 . . . bH/2.

In another configuration, processing may be executed in units of four pixels as follows.

Among the pixels of the template image, only the pixels of (−1+4*i, −1) and (−1, −1+4*j) are used for cost computation.

$tempCost=\Sigma abs(tpredSamples[-1+4*i][-1]-tempSamples[-1+4*i][-1])+\Sigma abs(tpredSamples[-1][-1+4*j]-tempSamples[-1][-1+4*j])$ Here, i=0 . . . bW/4 and j=0 . . . bH/4.

Alternatively, as illustrated in FIG. 9B, multiple points near the target block may be used as a template region. In this figure, (is, js)=(xC−2, yC) and (xC, yC−2).

The rate of sub-sampling may be changed depending on the block size.

For bH==4, (−1, −1+2*j), and otherwise (e.g., bH>4), (−1, −1+4*j). For bW==4, (−1+2*i, −1), and otherwise (e.g., bW>4), (−1+4*i−1).

In this way, the template prediction image generation unit 4712 may use variables (e.g., is and js) that are incremented by a value greater than 1 to derive the cost by using the pixel values of the sampling (discrete) positions in the template prediction image and the pixel values of the sampling (discrete) positions in the template image.

By deriving the cost of the template image from the pixels at the sub-sampled positions as described above, the configuration described above is effective in reducing the amount of processing compared to a configuration that derives the cost for all the pixels of a continuous region.

Another Configuration Example 1

Figure 10:
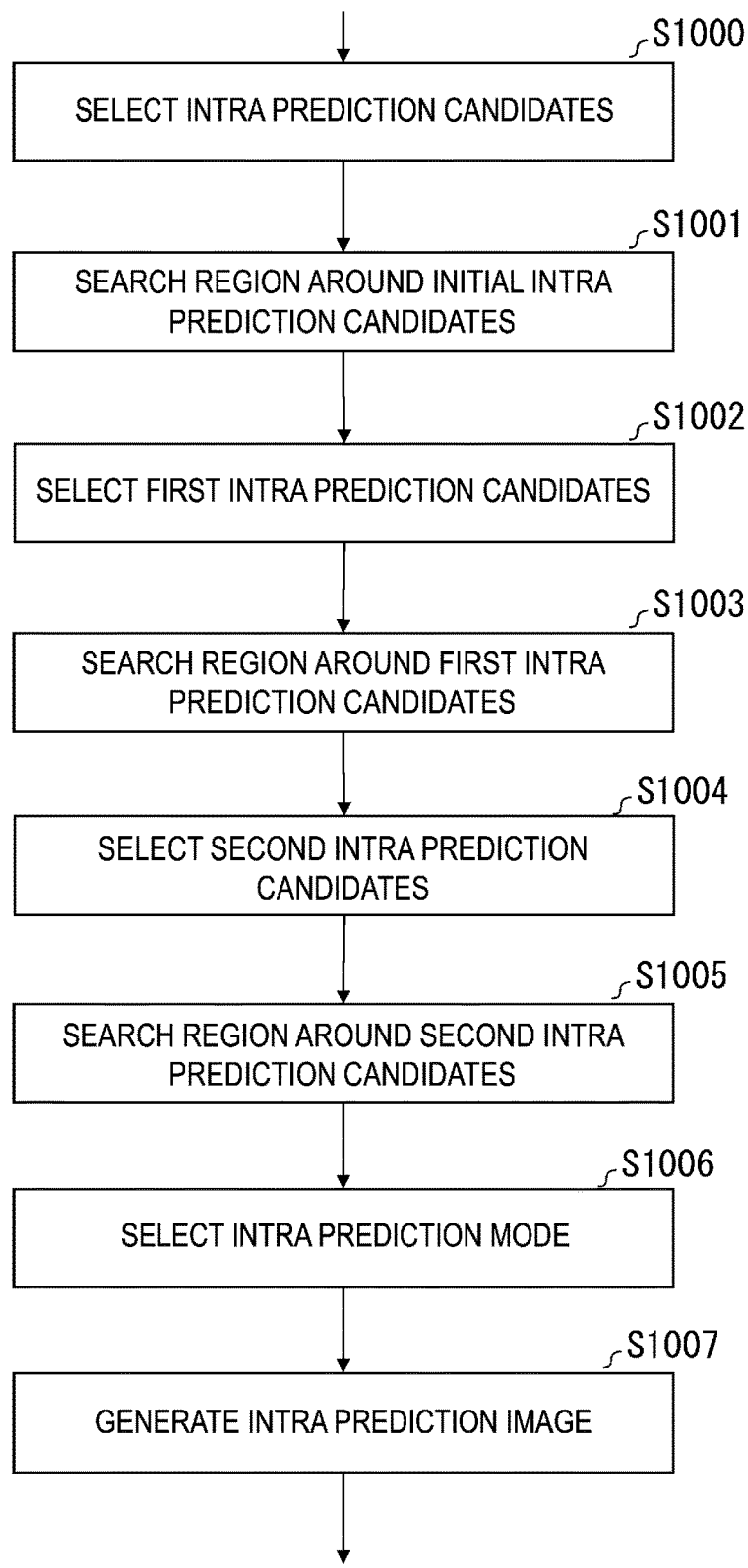
FIG. 10 is a flowchart illustrating a multi-stage intra prediction mode search in the TIMD prediction.

FIG. 10 is a flowchart illustrating a multi-stage intra prediction mode search in the TIMD prediction.

The TIMD prediction unit 31047 uses the template prediction image generation unit 4712 to generate a template prediction image for intra prediction mode candidates, and uses the template cost derivation unit 4713 to derive the cost from the template prediction image and the template image, and derives the TIMD intra prediction mode. Here, the TIMD prediction unit 31047 may use multiple steps as described below to set intra prediction mode candidates and selects the TIMD intra prediction mode:

(S1000) derive timdModeList from the MPM list candModeList[ ];

(S1001) generate a template prediction image for intra prediction mode candidates separated from one another by a prescribed value D1 (e.g., D1=4), and derive the cost. For example, for tIntraPredMode=2 . . . 66, create a template prediction image for only the directions of 5+4N (N=0 . . . N0-1, N0=16) modes for cost computation;

(S1002) select first intra prediction mode candidates based on the cost in S1001. For example, select only N1 (for example, N1=2) intra prediction mode candidates with small costs;

(S1003) generate a template prediction image for nearby prediction modes separated from one another by a prescribed value D2 (for example, D2=2) around the first intra prediction modes derived in S1002, and derive the cost. For example, create a template prediction image for prediction modes obtained by the first intra prediction modes±2;

(S1004) select second intra prediction mode candidates based on the cost in S1003. For example, select only N2 (for example, N2=1 or 2) intra prediction mode candidates with small costs;

(S1005) generate a template prediction image for nearby prediction modes separated from one another by a prescribed value D3 (for example, D3=1) around the second intra prediction modes derived in S1004, and derive the cost. For example, create a template prediction image for prediction modes obtained by the second intra prediction modes±1;

(S1006) derive a prediction direction corresponding to the minimum cost in S1005 as a TIMD intra prediction mode;

(S1007) generate an intra prediction image for the TIMD intra prediction mode derived in S1006.

Overall, among N0+2*N1+2*N2 prediction directions with small costs, compute the minimum predictive direction (intra prediction mode). In a case that the total number of intra prediction directions is denoted as NN and N0=NN/4, N1=2, and N2=1, the total number of searches is NN/4+6, and thus the configuration described above can reduce the number of searches to approximately ¼ compared to a configuration that searches all of the NN intra prediction directions.

The template prediction image generation unit 4712 generates a template prediction image from intra prediction mode candidates separated from one another by the predetermined difference value D1, uses the cost derivation unit to derive the cost, and derives the first intra prediction mode. Then, a template prediction image is generated from the intra prediction mode candidate separated from intra prediction modes separated from the first intra prediction modes by the difference value D2 that is smaller than the prescribed difference value D1, the cost derivation unit is used to derive the cost, and second intra prediction modes are derived. Then, a template prediction image is generated from intra prediction mode candidates separated from the second intra prediction modes by the difference value D3 that is smaller than the prescribed difference value D2, the cost derivation unit is used to derive the cost, and the TIMD intra prediction modes is derived. A feature of the configuration described above is that the intra prediction mode selection unit 4714 computes the cost for only a small number of intra prediction modes.

As described above, the intra prediction mode with the minimum cost is searched for by executing search on less accurate intra prediction mode candidates separated from one another by the large difference value D1 and then on accurate intra prediction mode candidates separated by the small difference D2 or D3. This configuration is effective in reducing the amount of processing required to select intra prediction modes compared to a configuration that derives the cost for all continuous intra prediction modes.

Here, the number of search stages is not limited to three, and the present embodiment is not limited to D1=4, D2=2, or D3=1. The number of search stages may be two, and D1=2 and D2=1 may be used.

For example, the following configuration may be employed.

For IntraPredMode=2 . . . 66, the cost is computed by creating a template prediction image for only the directions of intra prediction modes with odd values (IntraPredMode=2*i+1, i=0 . . . 32). Among N1 intra prediction modes with small costs, a template prediction image is created for prediction modes corresponding to intra prediction modes with odd values±1.

Since the minimum prediction direction (prediction mode) is computed from NN/2+2 prediction modes with small costs, the number of searches can be reduced to approximately half of all the searches. Note that even values (IntraPredMode=2*i, i=0 . . . 33) may be used instead of the odd values.

Another Configuration 2

In the cost computation for the template prediction image generated from the limited intra prediction mode candidates, whether to continue the processing may be switched (early termination) depending on whether any intra prediction mode has a smaller cost than a specific intra prediction mode. In other words, this configuration may switch whether generation of a template prediction image and cost derivation are continuously performed on each intra prediction mode candidate tIntraPredMode. For example, a primary MPM list corresponding to a first list (e.g., candModeList described above) is generated in which the intra prediction mode candidates are limited. In a case that the primary MPM list contains an intra prediction mode candidate intraPredMode_min1 having a cost tempCostMin1 smaller than the cost tempCostDC_Planar of the DC or Planar prediction, then a secondary MPM list corresponding to a second list (e.g., candModeList2) is generated. Otherwise (in a case that in the primary MPM list, the cost tempCostDC_Planar of the DC or Planar prediction is minimum), the TIMD intra prediction mode is set as the DC or Planar prediction. tempCostDC_Planar is the smaller of the cost tempCostDC of the DC prediction and the cost tempCostPlanar of the Planar prediction.

tempCostDC_Planar=min(tempCostDC,tempCostPlanar)

The secondary MPM list includes none of the intra prediction modes included in the primary MPM list. The secondary MPM list may include some of the intra prediction modes not included in the primary MPM list. A template prediction image is generated for each intra prediction mode candidate included in the list, and the cost is derived. In other words, in a case that an intra prediction mode candidate intraPredMode_min2 included in the secondary MPM list has a cost tempCostMin2 less than the current minimum cost tempCostMin1, the TIMD intra prediction mode is replaced with intraPredMode_min2. Otherwise (in a case that tempCostMin1<=tempCostMin2), the TIMD intra prediction mode is set as intraPredMode_min1.

Figure 11:
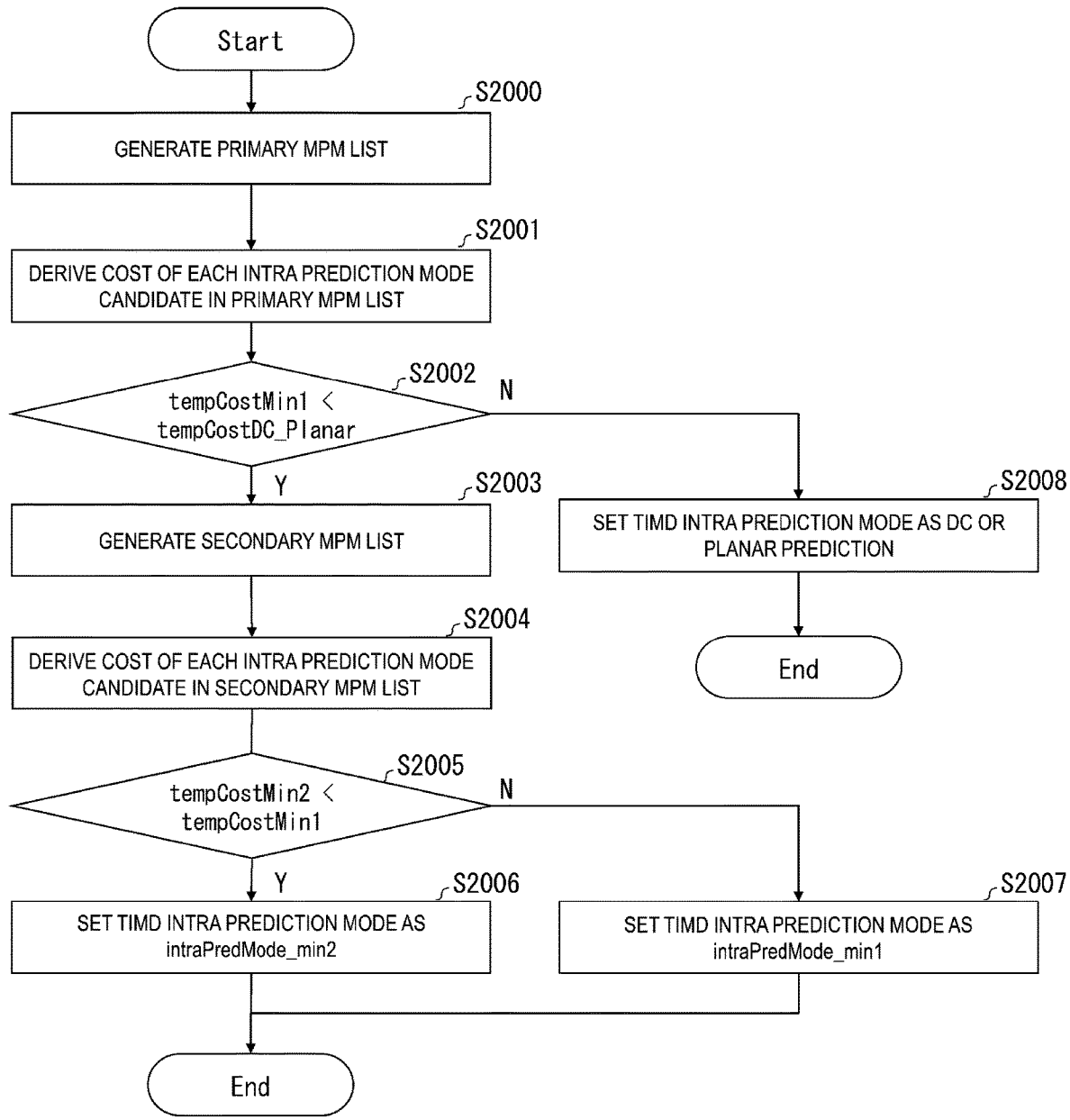
FIG. 11 is a flowchart illustrating early termination of the intra prediction mode search in the TIMD prediction.

FIG. 11 is a flowchart illustrating operations of the template prediction image generation unit 4712 according to the present embodiment:

(S2000) generate a primary MPM list;
(S2001) derive the cost of the template prediction image of each of the intra prediction mode candidates in the primary MPM list;
(S2002) in a case that tempCostMin1<tempCostDC_Planar, transitions to (S2003), otherwise transitions to (S2008);
(S2003) generate a secondary MPM list;
(S2004) derive the cost of the template prediction image of each of the intra prediction mode candidates in the secondary MPM list;
(S2005) in a case that tempCostMin2<tempCostMin1, transitions to (S2006). Otherwise, transitions to (S2007);
(S2006) set the TIMD intra prediction mode as intraPredMode_min2;
(S2007) set the TIMD intra prediction mode as intraPredMode_min1;
(S2008) set the TIMD intra prediction mode as the DC or Planar prediction (set as an intra prediction mode with the cost tempCostDC_Planar).

For example, the primary MPM list is a list of DC intra prediction mode candidates, Planar intra prediction mode candidates, and intra prediction mode candidates with odd values, and the secondary MPM list is a list of intra prediction mode candidates with even values other than the DC and Planar intra prediction mode candidates.

Alternatively, the primary MPM list is a list of intra prediction mode candidates with odd values, and the secondary MPM list is a list of intra prediction mode candidates with even values. In this case, the primary MPM list includes no Planar intra prediction mode candidates, and thus tempCostDC_Planar described above is the cost of the template prediction image corresponding to the DC prediction.

Alternatively, the primary MPM list is a list of intra prediction mode candidates with even values, and the secondary MPM list is a list of intra prediction mode candidates with odd values. In this case, the primary MPM list includes no DC intra prediction mode candidates, and thus tempCostDC_Planar described above is the cost of the template prediction image corresponding to the Planar prediction.

In the search of the list in which the intra prediction mode candidates are limited as described above, whether to perform the subsequent processing may be switched by using a prescribed offset. In other words, whether to perform the subsequent search for intra prediction modes using the secondary MPM list (generation of a template prediction image, derivation of the cost using the template prediction image, and update of the intra prediction mode with the minimum cost) may be switched. For example, in a case that the primary MPM list contains any intra prediction mode candidate with a cost smaller than the cost of the DC prediction+offset or Planar prediction+offset, then the cost of the template prediction image corresponding to the intra prediction mode candidate included in the secondary MPM list is derived. In other words, (S2002) in FIG. 11 is replaced with tempCostMin1<tempCostDC_Planar+offset. Otherwise (in a case that the primary MPM list contains no intra prediction mode candidates with a cost smaller than the cost of the DC prediction+offset or Planar prediction+offset), the template prediction image corresponding to the intra prediction mode candidate included in the secondary MPM list is not generated, and the cost is not derived.

As described above, the processing is limited to the intra prediction mode candidates from which a preferable prediction image is likely to be obtained, and the cost in the template prediction image is used to perform early termination. This allows avoidance of template prediction image generation and cost derivation for intra prediction modes with a low possibility at which a preferable prediction image is obtained, producing an effect of reducing the amount of processing required to select the intra prediction mode.

A rough search (step search, Another Configuration 1) using intra prediction mode candidates as described above may be combined with a search (early termination, Another Configuration 2) using a list where the intra prediction mode candidates are limited as described above, to derive a TIMD intra prediction mode with a reduced cost. Specifically, a template prediction image is generated that corresponds to only the intra prediction modes in the MPM list that have odd values and that are other than the DC prediction, and the cost is examined. The cost of the intra prediction mode candidate is examined, the intra prediction mode candidate corresponding to the intra prediction mode candidate intraPredMode_min1±1. the intra prediction mode candidate intraPredMode_min1 corresponding to the minimum cost tempCostMin1. Then, the intra prediction mode candidate intraPredMode_min2 corresponding to tempCostMin2 may be derived as the TIMD intra prediction mode.

The addition unit 312 adds the prediction image of the block input from the prediction image generation unit 308 and the prediction error input from the inverse quantization and inverse transform processing unit 311 for each pixel, and generates a decoded image of the block. The addition unit 312 stores the decoded image of the block in the reference picture memory 306, and also outputs it to the loop filter 305.

Configuration of Video Coding Apparatus

Figure 12:
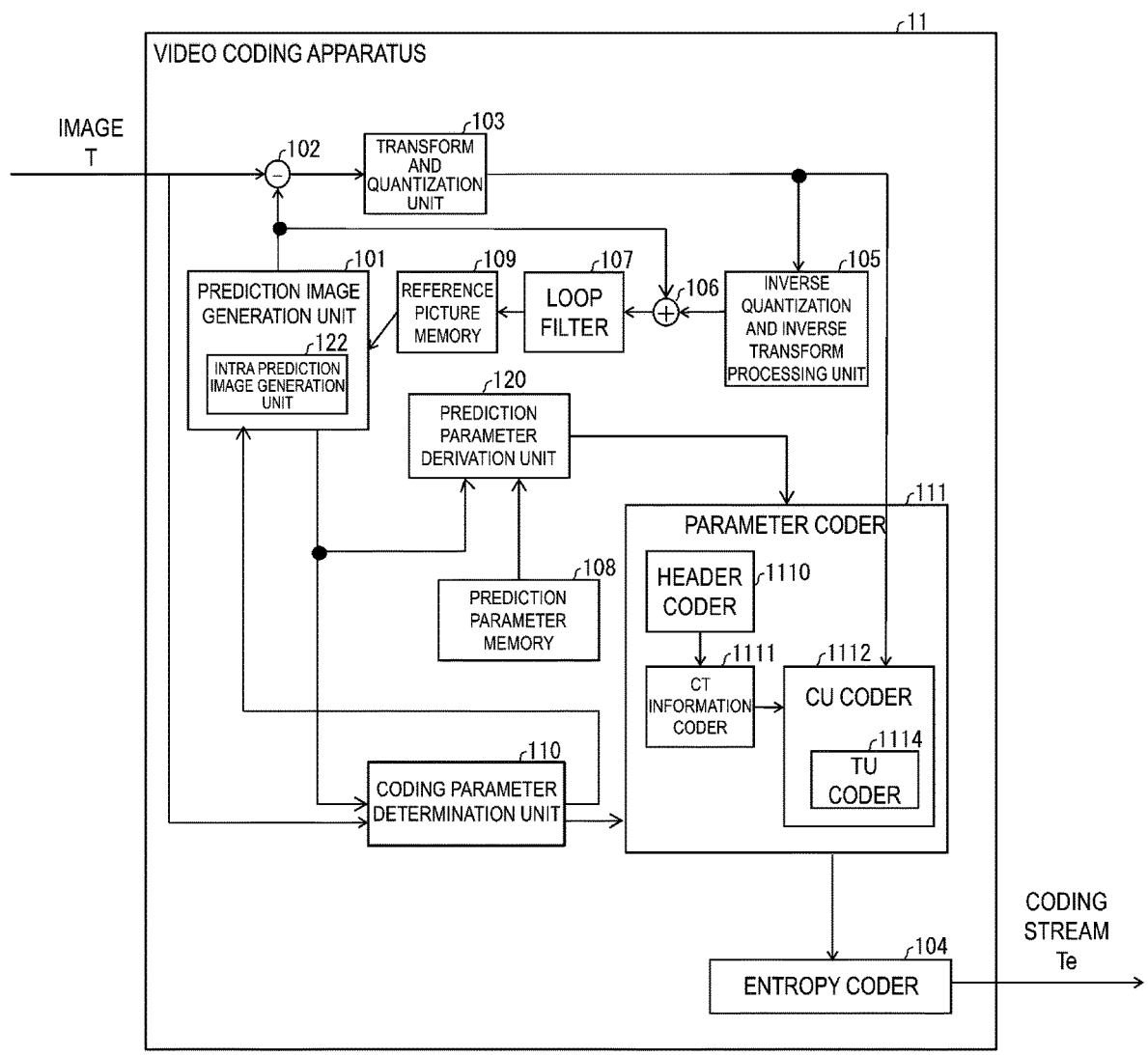
FIG. 12 is a block diagram illustrating a configuration of a video coding apparatus.

Next, a configuration of the video coding apparatus 11 according to the present embodiment will be described. FIG. 12 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a parameter coder 111, a prediction parameter derivation unit 120, and an entropy coder 104.

The prediction image generation unit 101 generates a prediction image for each CU that is a region obtained by splitting each picture of an image T. The prediction image generation unit 101 includes an intra prediction image generation unit 122 and an inter prediction image generation unit 123. The operation of the prediction image generation unit 101 is the same as that of the prediction image generation unit 308 already described, and description thereof will be omitted.

The subtraction unit 102 subtracts a pixel value of the prediction image of a block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantization transform coefficient by quantization. The transform and quantization unit 103 outputs the quantization transform coefficient to the parameter coder 111 and the inverse quantization and inverse transform processing unit 105.

The inverse quantization and inverse transform processing unit 105 is the same as the inverse quantization and inverse transform processing unit 311 (FIG. 4) in the video decoding apparatus 31, and descriptions thereof are omitted. The calculated prediction error is output to the addition unit 106.

The parameter coder 111 includes a header coder 1110, a CT information coder 1111, and a CU coder 1112 (prediction mode coder). The CU coder 1112 further includes a TU coder 1114. General operation of each module will be described below.

The header coder 1110 performs coding processing of parameters such as header information, split information, prediction information, and quantization transform coefficients.

The CT information coder 1111 codes the QT and MT (BT, TT) split information and the like.

The CU coder 1112 codes the CU information, the prediction information, the split information, and the like.

In a case that a prediction error is included in the TU, the TU coder 1114 codes the QP update information and the quantization prediction error.

The CT information coder 1111 and the CU coder 1112 supply, to the parameter coder 111, syntax elements such as the inter prediction parameter, the intra prediction parameter, and the quantization transform coefficient.

The parameter coder 111 inputs the quantization transform coefficient and the coding parameters to the entropy coder 104. The entropy coder 104 entropy-codes the quantization transform coefficient and the coding parameters to generate a coding stream Te and outputs the coding stream Te.

The prediction parameter derivation unit 120 is a component including the inter prediction parameter coder 112 and the intra prediction parameter coder 113, and derives an inter prediction parameter and an intra prediction parameter from the parameters input from the coding parameter determination unit 110. The inter prediction parameter and intra prediction parameter derived are output to the parameter coder 111.

Configuration of Intra Prediction Parameter Coder 113

The intra prediction parameter coder 113 codes IntraPredMode input from the coding parameter determination unit 110. The intra prediction parameter coder 113 includes a partly identical configuration to a configuration in which the intra prediction parameter derivation unit 304 derives the intra prediction parameters.

The addition unit 106 adds together, for each pixel, a pixel value for the prediction block input from the prediction image generation unit 101 and a prediction error input from the inverse quantization and inverse transform processing unit 105, generating a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may have a configuration of only the deblocking filter, for example.

The prediction parameter memory 108 stores the prediction parameters generated by the coding parameter determination unit 110 for each target picture and CU at a predetermined position.

The reference picture memory 109 stores the decoded image generated by the loop filter 107 for each target picture and CU at a predetermined position.

The coding parameter determination unit 110 selects one set among multiple sets of coding parameters. The coding parameters include QT, BT, or TT split information described above, a prediction parameter, or a parameter to be coded which is generated related thereto. The prediction image generation unit 101 generates the prediction image by using these coding parameters.

The coding parameter determination unit 110 calculates, for each of the multiple sets, an RD cost value indicating the magnitude of an amount of information and a coding error. The coding parameter determination unit 110 selects a set of coding parameters of which cost value calculated is a minimum value. In this manner, the entropy coder 104 outputs a set of selected coding parameters as the coding stream Te. The coding parameter determination unit 110 stores the determined coding parameters in the prediction parameter memory 108.

Note that a computer may be used to implement some of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction parameter derivation unit 320, the prediction image generation unit 101, the subtraction unit 102, the transform and quantization unit 103, the entropy coder 104, the inverse quantization and inverse transform processing unit 105, the loop filter 107, the coding parameter determination unit 110, a parameter coder 111, and the prediction parameter derivation unit 120. In that case, this configuration may be realized by recording a program for realizing such control functions on a computer-readable recording medium and causing a computer system to read the program recorded on the recording medium for execution. Note that the "computer system" mentioned here refers to a computer system built into either the video coding apparatus 11 or the video decoding apparatus 31 and is assumed to include an OS and hardware components such as a peripheral apparatus. A "computer-readable recording medium" refers to a portable medium such as a flexible disk, a magneto-optical disk, a ROM, and a CD-ROM, and a storage device such as a hard disk built into the computer system. Moreover, the "computer-readable recording medium" may include a medium that dynamically retains the program for a short period of time, such as a communication wire that is used to transmit the program over a network such as the Internet or over a communication line such as a telephone line, and a medium that retains the program for a certain period of time, such as a volatile memory within the computer system which functions as a server or a client in a case that the program is transmitted via the communication wire. Furthermore, the aforementioned program may be configured to implement part of the functions described above, and also may be configured to be capable of implementing the functions described above in combination with a program already recorded in the computer system.

A part or all of the video coding apparatus 11 and the video decoding apparatus 31 in the embodiment described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not limited to LSI but may be realized as dedicated circuits or a multi-purpose processor. Furthermore, in a case that advances in semiconductor technology lead to the advent of a circuit integration technology that replaces an LSI, an integrated circuit based on the circuit integration technology may be used.

The embodiment of the present invention has been described in detail above referring to the drawings, but the specific configuration is not limited to the above embodiment and various amendments can be made to a design that fall within the scope that does not depart from the gist of the present invention.

INDUSTRIAL APPLICABILITY

The embodiment of the present invention can be preferably applied to a video decoding apparatus that decodes coded data in which image data is coded, and a video coding apparatus that generates coded data in which image data is coded. The embodiment of the present invention can be preferably applied to a data structure of coded data generated by the video coding apparatus and referred to by the video decoding apparatus.

REFERENCE SIGNS LIST

31 Image decoding apparatus
301 Entropy decoder
302 Parameter decoder
303 Inter prediction parameter derivation unit
304 Intra prediction parameter derivation unit
308 Prediction image generation unit
309 Inter prediction image generation unit
310 Intra prediction image generation unit
31047 TIMD prediction unit
4701 Reference sample derivation unit
4702 Template derivation unit
4703 Intra prediction unit
4704 bit shift derivation unit
4711 Intra prediction mode candidate derivation unit
4712 Template prediction image generation unit
4713 Template cost derivation unit
4714 Intra prediction mode selection unit
311 Inverse quantization and inverse transform processing unit
312 Addition unit
320 Prediction parameter derivation unit
11 Image coding apparatus
101 Prediction image generation unit
102 Subtraction unit
103 Transform and quantization unit
104 Entropy coder
105 Inverse quantization and inverse transform processing unit
107 Loop filter
110 Coding parameter determination unit
111 Parameter coder
1110 Header coder
1111 CT information coder
1112 CU coder (prediction mode coder)
1114 TU coder
120 Prediction parameter derivation unit

The invention claimed is:

1. An image decoding apparatus comprising:
a parameter decoder circuit configured to decode a template-based intra mode derivation flag from coded data;
a reference sample derivation circuit configured to derive a reference sample in a current image by using an image of a template reference region near a target block in the current image;
an intra prediction image generation circuit configured to generate, by using the reference sample, a template prediction image for a predetermined intra prediction mode candidate;
a template cost derivation circuit configured to derive a cost from the template prediction image and a template image corresponding to an image near the target block; and
an intra prediction mode selection circuit configured to select a template intra prediction mode for the target block based on the cost, wherein
in a case that the template-based intra mode derivation flag has a prescribed value, a prediction image of the target block is generated by using the template intra prediction mode, and
the template image is positioned in at least one region, and the at least one region includes discontinuous regions that are positioned in an identical direction.

2. The image decoding apparatus according to claim 1, wherein
the template cost derivation circuit derives the cost by using a variable to be incremented by a value greater than 1 and by using a pixel value at a sampling position in the template prediction image and a pixel value at a sampling position in the template image.

3. The image decoding apparatus according to claim 1, wherein
the intra prediction image generation circuit:
generates a first template prediction image from an intra prediction mode candidate separated from a certain intra prediction mode candidate by a prescribed difference value D1, derives a cost of the first template prediction image and the template image by using the template cost derivation circuit, and derives a first intra prediction mode,
generates a second template prediction image from an intra prediction mode candidate separated from the first intra prediction mode by a difference value D2 smaller than the prescribed difference value D1, derives a cost of the second template prediction image and the template image by using the template cost derivation circuit, and derives a second intra prediction mode, and
generates a third template prediction image from an intra prediction mode candidate separated from the second intra prediction mode by a difference value D3 smaller than the difference value D2, derives a cost of the third template prediction image and the template image by using the template cost derivation circuit, and derives a third intra prediction mode to allow the intra prediction mode selection circuit to select the third intra prediction mode as the template intra prediction mode.

4. The image decoding apparatus according to claim 1, wherein
the intra prediction image generation circuit:
generates a plurality of template prediction images, including the template prediction image, from limited ones of a plurality of intra prediction mode candidates, including the predetermined intra prediction mode candidate,
derives a cost of the plurality of template prediction images and the template image by using the cost derivation circuit, and
decides whether or not to generate another template prediction image and derive a cost for remaining ones of the plurality of intra prediction mode candidates depending on whether the other template prediction image, among the plurality of template prediction images, is present that corresponds to an intra prediction mode having a smaller cost than a specific intra prediction mode.

5. The image decoding apparatus according to claim 1, wherein
positions of the discontinuous regions that are positioned in the identical direction are (x,y)=(−1,−1+k*j) and (x,y)=(−1+k*i,−1),
where i=0 . . . bW/k, j=0 . . . bH/k, the bW is a block width of the target block, the bH is a block height of the target block, and the k is a rate of sub-sampling and is a positive integer greater than 1.

6. The image decoding apparatus according to claim 5, wherein
the k is 2 or 4.

7. The image decoding apparatus according to claim 1, wherein
a number of positions of the discontinuous regions that are positioned in the identical direction is two.

8. The image decoding apparatus according to claim 1, wherein
a rate of sub-sampling or a number of positions of the discontinuous regions that are positioned in the identical direction is changed depending on a block size of the target block.

9. An image coding apparatus comprising:
a reference sample derivation circuit configured to derive a reference sample in a current image by using an image of a template reference region near a target block in the current image;
an intra prediction image generation circuit configured to generate, by using the reference sample, a template prediction image for a predetermined intra prediction mode candidate;
a template cost derivation circuit configured to derive a cost from the template prediction image and a template image corresponding to an image near the target block;
an intra prediction mode selection circuit configured to select a template intra prediction mode for the target block based on the cost; and
a parameter coder circuit configured to code the template intra prediction mode as a template-based intra mode derivation flag, wherein in a case that the template-based intra mode derivation flag has a predetermined value, a prediction image of the target block is generated by using the template intra prediction mode, and
the template image is positioned in at least one region, and the at least one region includes discontinuous regions that are positioned in an identical direction.

10. The image coding apparatus according to claim 9, wherein
the template cost derivation circuit derives the cost by using a variable to be incremented by a value greater than 1 and by using a pixel value at a sampling position in the template prediction image and a pixel value at a sampling position in the template image.

11. The image coding apparatus according to claim 9, wherein
the intra prediction image generation circuit:
generates a first template prediction image from an intra prediction mode candidate separated from a certain intra prediction mode candidate by a prescribed difference value D1, derives a cost of the first template prediction image and the template image by using the template cost derivation circuit, and derives a first intra prediction mode,
generates a second template prediction image from an intra prediction mode candidate separated from the first intra prediction mode by a difference value D2 smaller than the prescribed difference value D1, derives a cost of the second template prediction image and the template image by using the template cost derivation circuit, and derives a second intra prediction mode, and
generates a third template prediction image from an intra prediction mode candidate separated from the second intra prediction mode by a difference value D3 smaller than the difference value D2, derives a cost of the third template prediction image and the template image by using the template cost derivation circuit, and derives a third intra prediction mode to allow the intra prediction mode selection circuit to select the third intra prediction mode as the template intra prediction mode.

12. The image coding apparatus according to claim 9, wherein
the intra prediction image generation circuit:
generates a plurality of template prediction images, including the template prediction image, from limited ones of a plurality of intra prediction mode candidates, including the predetermined intra prediction mode candidate,
derives a cost of the plurality of template prediction images and the template image by using the cost derivation circuit, and
decides whether or not to generate another template prediction image and derive a cost for remaining ones of the plurality of intra prediction mode candidates depending on whether the other template prediction image, among the plurality of template prediction images, is present that corresponds to an intra prediction mode having a smaller cost than a specific intra prediction mode.

* * * * *